United States Patent
Tanno

(10) Patent No.: US 7,932,964 B2
(45) Date of Patent: Apr. 26, 2011

(54) LIQUID CRYSTAL DISPLAY DEVICE

(75) Inventor: Junji Tanno, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 395 days.

(21) Appl. No.: 12/292,330

(22) Filed: Nov. 17, 2008

(65) Prior Publication Data

US 2009/0128726 A1    May 21, 2009

(30) Foreign Application Priority Data

Nov. 19, 2007 (JP) ................................. 2007-299271

(51) Int. Cl.
*G02F 1/136* (2006.01)
(52) U.S. Cl. ............. 349/43; 349/42; 349/139; 349/141
(58) Field of Classification Search .................. 349/141, 349/42, 43, 139, 138, 143, 146, 147
See application file for complete search history.

(56) References Cited

U.S. PATENT DOCUMENTS

| | | | |
|---|---|---|---|
| 7,256,853 B2 * | 8/2007 | Ono et al. | 349/141 |
| 7,486,345 B2 * | 2/2009 | Ono et al. | 349/43 |
| 2005/0105032 A1 * | 5/2005 | Ono et al. | 349/139 |
| 2005/0105034 A1 * | 5/2005 | Ono et al. | 349/143 |
| 2009/0059139 A1 * | 3/2009 | Kurasawa | 349/106 |
| 2009/0128726 A1 * | 5/2009 | Tanno | 349/43 |

FOREIGN PATENT DOCUMENTS

| | | | |
|---|---|---|---|
| JP | 2000-292802 | 4/1999 | 349/43 X |
| JP | 2003-280017 | 3/2002 | 349/43 X |

* cited by examiner

*Primary Examiner* — Brian M Healy
(74) *Attorney, Agent, or Firm* — Stites & Harbison, PLLC; Juan Carlos A. Marquez, Esq

(57) ABSTRACT

An IPS-method liquid crystal display device which exhibits small directivity of a viewing angle and high brightness is realized. A planar common electrode is arranged below a pixel electrode which includes comb-teeth-shaped electrodes and slits. When a video signal is applied to the pixel electrode, an electric field is generated between the pixel electrode and the common electrode by way of slit portions formed in the pixel electrode thus controlling liquid crystal molecules. To reduce the occurrence of a phenomenon that an abnormal domain is generated in an end portion of the slit and the abnormal domain lowers transmissivity of liquid crystal, the structure in which the slits having both ends thereof closed and the slits having one-side end portion thereof opened are alternately arranged next to each other in parallel is adopted.

9 Claims, 17 Drawing Sheets

LIQUID CRYSTAL DISPLAY DEVICE

The present application claims priority from Japanese application JP2007-299271 filed on Nov. 19, 2007, the content of which is hereby incorporated by reference into this application.

BACKGROUND OF THE INVENTION

1. Field of the Invention

The present invention relates to a liquid crystal display device, and more particularly to a lateral-electric-field liquid crystal display device which exhibits excellent viewing angle characteristic and brightness characteristic.

2. Background Art

A liquid crystal display device includes a TFT substrate on which pixel electrodes, thin film transistors (TFT) and the like are formed in a matrix array and a counter substrate which forms color filters or the like thereon at places where the color filters faces the pixel electrodes in an opposed manner, and liquid crystal is sandwiched between the TFT substrate and the counter substrate. Further, an image is formed by controlling transmissivity of light for every pixel by driving liquid crystal molecules.

A viewing angle characteristic is critically important in the liquid crystal display device. The viewing angle characteristic is a phenomenon that brightness is changed or chromaticity is changed between a case where a screen is observed from a front side and a case where the screen is observed in the oblique direction. With respect to the viewing angle characteristic, an IPS (In Plane Switching)-liquid crystal display device which operates liquid crystal molecules using an electric field which contains at least electric-field components in the horizontal direction exhibits excellent viewing angle characteristic.

Although the IPS-method liquid crystal display device exhibits an excellent viewing angle characteristic, pixel electrodes and common electrodes (also referred to as counter electrodes) are formed on the same substrate, that is, on a TFT substrate and hence, the IPS-method liquid crystal display device has a drawback that a so-called TN-method liquid crystal display device in which pixel electrodes are formed on a TFT substrate and counter electrodes are formed on a counter substrate does not have.

The constitution of the IPS-method liquid crystal display device has various modes. In the constitution of one mode, the pixel electrode and the counter electrode are respectively formed into a comb-teeth shape, and the pixel electrode and the counter electrode are alternately arranged next to each other in parallel. In this constitution, distal ends of the comb-teeth are set as open ends and, at the same time, open ends of the comb teeth of the pixel electrode and open ends of the comb teeth of the counter electrode are arranged on the same side and hence, the open ends of the comb teeth are easily influenced by a potential of other electrodes or lines. Particularly, when a scanning line is arranged adjacent to the open end of the comb teeth, the open end of the comb teeth is easily influenced by the potential of the scanning line.

JP-A-2000-292802 (patent document 1) discloses the constitution which prevents the influence of a potential of a scanning line from impregnating a region where liquid crystal within a comb teeth is controlled by increasing widths of open ends of comb-teeth-shaped electrodes of pixel electrodes and common electrodes.

Although the IPS-method liquid crystal display device possesses an excellent viewing angle characteristic compared with a liquid crystal display device adopting other liquid crystal driving method, the viewing angle characteristic of the IPS-method liquid crystal display device is less than optimal. For example, a hue is delicately changed between a case where a screen is observed from one direction and a case where the screen is observed in another direction. Although this change of hue is very small compared to a change of hue in a liquid crystal display device adopting other liquid crystal driving method, there still exists a space for improvement.

JP-A-2003-280017 (patent document 2) discloses the constitution which reduces the directivity of a viewing angle in such a manner that comb-teeth-shaped pixel electrodes and comb-teeth-shaped common electrodes are bent in a chevron shape within one pixel, and the rotational direction of the liquid crystal is set in two directions within one pixel. However, by bending the pixel electrodes or the like in a chevron shape, particularly in a proximal portion of the comb teeth, an abnormal electric field is generated thus forming places where liquid crystal cannot be controlled. Patent document 2 discloses the constitution which improves a shape of the electrode in the proximal end of the comb teeth of the pixel electrode or the like thus reducing such an abnormal electric field leading to the suppression of the decrease of transmissivity.

Other drawback of the IPS-method liquid crystal display device lies in that the pixel electrodes and the common electrodes are formed on the same substrate, that is, on the TFT substrate and hence, transmissivity of light from a backlight is lowered. That is, in the so-called TN-method liquid crystal display device or the like, although the pixel electrodes are formed on the TFT substrate, the common electrodes are formed on the counter substrate. Accordingly, the TN-method liquid crystal display device can reduce an area where light is blocked by the electrodes compared to the IPS-method liquid crystal display device.

To overcome such a drawback, there has been proposed a following IPS-method liquid crystal display device. That is, pixel electrodes and common electrodes are formed on different layers, the pixel electrode has comb-teeth-shaped electrodes and slits, and a common electrode is formed of a planar electrode. The comb-teeth-shaped electrode has a distal ends thereof closed, and liquid crystal molecules are controlled by the electric field generated between the comb-teeth-shaped electrodes and common electrodes thus forming an image. By forming the pixel electrodes and the common electrodes using a transparent electrode, transmissivity of the liquid crystal display device is largely enhanced thus enabling the acquisition of transmissivity sufficiently comparative to the transmissivity of the liquid crystal display device of TN-method or the like.

Due to such constitution, this IPS-method liquid crystal display device can largely enhance the transmissivity compared to the conventional IPS-method liquid crystal display device. However, there still exists a space for improvement with respect to this IPS-method liquid crystal display device. That is, at the distal end of the comb teeth which is closed, there arises a phenomenon in which a region where the liquid crystal cannot be controlled is formed and the transmissivity is lowered in such a portion.

Y. B. Lee, et al. IDW'06 LCT5-4, P627-630 (non-patent document 1), for overcoming such a drawback, discloses the constitution which is configured to prevent the decrease of transmissivity by forming all slits formed in a pixel electrode into open ends and by forming a comb-teeth shape into a shape such as legs of a crab.

SUMMARY OF THE INVENTION

The object of the present invention lies in the further improvement of transmissivity in an IPS-method liquid crystal display device in which pixel electrodes formed of a transparent electrode and common electrodes formed of a transparent electrode are formed on different layers, the pixel electrodes 110 are formed in a comb-teeth shape, and the common electrodes are formed of a planar electrode. One example of the pixel electrode of the IPS-method liquid crystal display device having such constitution is shown in FIG. 17.

In FIG. 17, a pixel is formed in a laterally-extending trapezoidal shape. Slits 112 are formed in the trapezoidal pixel. A comb-teeth-shaped electrode 1101 is formed between this slit 112 and a slit arranged adjacent to the former slit 112. An electric field directed in a particular direction is generated in an end portion of the slit 112, that is, in a region A shown in FIG. 17, and a phenomenon that liquid crystal molecules 113 are not moved even when a video signal is applied to a pixel electrode 110 arises. Accordingly, the transmissivity of the liquid crystal display device is decreased by an amount corresponding to the region A.

Non-patent document 1 discloses the constitution which is configured to prevent the decrease of transmissivity in the region A by making lateral ends of the comb-teeth-shaped electrodes alternately open ended, that is, by making the comb-teeth-shaped electrodes into one meandering linear electrode and, at the same time, by forming a shape of the comb-teeth shape into a crab leg shape. However, in the constitution disclosed in non-patent document 1, only the single electrode is used and hence, there is a large possibility of the disconnection of the pixel electrode. Further, the formation of the pixel electrode into a crab-leg shape makes the shape of the pixel electrode complicated thus lowering a manufacturing yield ratio. Further, there arises a phenomenon that transmissivity is not enhanced to an expected level at a crab-leg-shaped portion.

It is an object of the present invention to provide an IPS-method liquid crystal display device which can enhance transmissivity while maintaining reliability of the liquid crystal display device against the disconnection of pixel electrodes and, at the same time, preventing lowering of a manufacturing yield ratio.

The present invention is provided for overcoming the above-mentioned drawbacks, and is characterized in that in a pixel electrode having slits and comb-teeth-shaped electrode, the slits having both ends thereof closed and the slits having only one-side end portions thereof opened are alternately arranged next to each other in parallel. Alternatively, the present invention is characterized in that the comb-teeth-shaped electrodes are cut-off portion at end portions of the slits. To explain specific means of the present invention, they are as follows.

(1) According to a first aspect of the present invention, there is provided a liquid crystal display device which includes: a TFT substrate; a counter substrate; and liquid crystal which is sandwiched between the TFT substrate and the counter substrate, wherein the TFT substrate includes planar first electrodes, an insulation film which covers the first electrodes, and second electrodes which are formed on the insulation film in an overlapping manner with the first electrodes, the second electrode includes slits and comb-teeth-shaped electrodes, the liquid crystal is configured to be driven by an electric field generated due to potential difference between the first electrode and the second electrode, and the slits are configured such that the slits having both ends thereof closed and the slits having only one-side end portion thereof opened are alternately arranged next to each other in parallel.

(2) In the liquid crystal display device having the constitution (1), within one pixel, the slits having only one-side end portions thereof opened are configured such that the slit opened on one end portion side and the slit opened on another end portion side are arranged alternately by way of the slit having both end portions thereof closed.

(3) In the liquid crystal display device having the constitution (1), within one pixel, the slits having said only one-side end portions thereof opened include the slits opened on one end portion side and the slits opened on another end portion side.

(4) In the liquid crystal display device having the constitution (1), within one pixel, the slits having said only one-side end portions thereof opened are opened only on the same one end portion side respectively.

(5) According to a second aspect of the present invention, there is provided a liquid crystal display device which includes: a TFT substrate; a counter substrate; and liquid crystal which is sandwiched between the TFT substrate and the counter substrate, wherein the TFT substrate includes planar first electrodes, an insulation film which covers the first electrodes, and second electrodes which are formed on the insulation film in an overlapping manner with the first electrodes, the second electrode includes slits and comb-teeth-shaped electrodes, the liquid crystal is configured to be driven by an electric field generated due to potential difference between the first electrode and the second electrode, and the comb-teeth-shaped electrode is configured such that a cut-off portion which is integrally formed with the slit is formed in one end portion side of comb-teeth-shaped electrode, and said one end portion side of the comb-teeth-shaped electrode has a width smaller than a width of another end portion side of the comb-teeth-shaped electrode.

(6) In the liquid crystal display device having the constitution (5), the slits are configured such that the slits having both ends thereof closed and the slits having only one-side end portions thereof opened are alternately arranged next to each other in parallel.

(7) According to a third aspect of the present invention, there is provided a liquid crystal display device which includes: a TFT substrate; a counter substrate; and liquid crystal which is sandwiched between the TFT substrate and the counter substrate, wherein the TFT substrate includes planar first electrodes, an insulation film which covers the first electrodes, and second electrodes which are formed on the insulation film in an overlapping manner with the first electrode, the second electrode includes slits and comb-teeth-shaped electrodes, the liquid crystal is configured to be driven by an electric field generated due to potential difference between the first electrode and the second electrode, and the comb-teeth-shaped electrode includes a first side and a second side which respectively extend in a longitudinal direction and face each other in an opposed manner with the slit sandwiched therebetween, a cut-off portion which is integrally formed with the slit is formed only in one side out of the first side and the second side on at least one end portion of the comb-teeth-shaped electrode, and another side out of the first side and the second side is formed in a straight line without being bent.

(8) In the liquid crystal display device having the constitution (7), the cut-off portion which is integrally formed with the slit only on one side is formed in both end portions of the comb-teeth-shaped electrode.

(9) In the liquid crystal display device having the constitution (7), the cut-off portion which is integrally formed with the slit only on one side is formed in only one end portion of the comb-teeth-shaped electrode.

According to the present invention, in the IPS-method liquid crystal display device which includes the TFT substrate on which the pixel electrodes having the comb-teeth-shaped electrode and the slits and the planar common electrode are formed in an overlapping manner by way of the insulation film, an abnormal domain in the slit end portion, that is, a region where control of liquid crystals in response to a video signal applied to the pixels is not possible can be decreased and hence, transmissivity of the liquid crystal display device

DESCRIPTION OF THE PREFERRED EMBODIMENT

Figure 1:
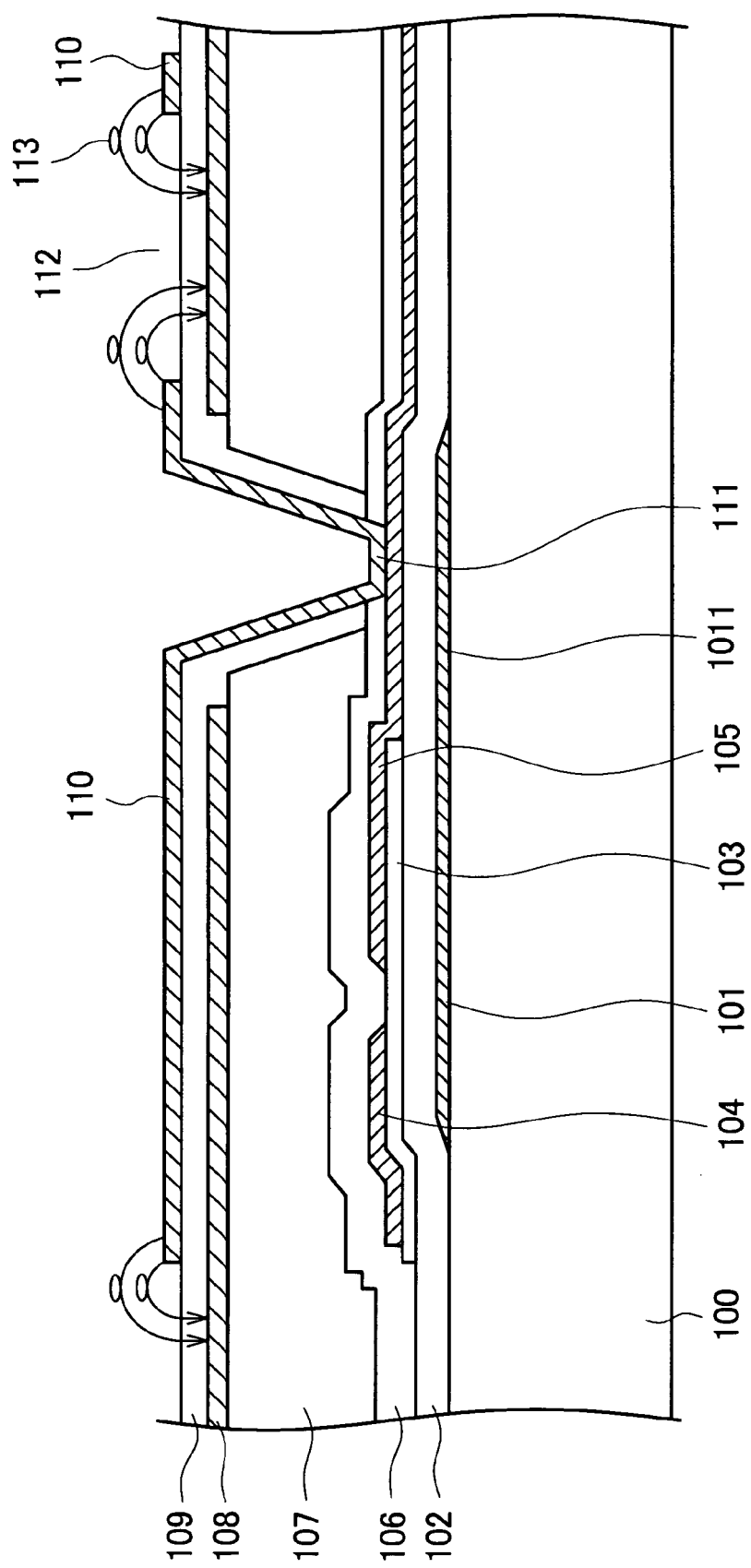
FIG. 1 is a cross-sectional view of a liquid crystal display device to which the present invention is applied.

Prior to the explanation of specific embodiments of the present invention, the structure of an IPS-method liquid crystal display device (hereinafter, referred to as an IPS) to which the present invention is applied is explained. FIG. 1 is a cross-sectional view of the vicinity of a TFT of the IPS to which the present invention is applied. In FIG. 1, on a TFT substrate 100 made of glass, gate electrodes 101 are formed. The gate electrodes 101 are formed on the same layer with scanning lines 1011. The gate electrode 101 is formed by stacking an MoCr alloy layer on an AlNd alloy layer.

A gate insulation film 102 made of SiN is formed so as to cover the gate electrodes 101. On the gate insulation film 102, semiconductor layers 103 made of a-Si are formed at positions where the semiconductor layers 103 face the gate electrodes 101 in an opposed manner. The semiconductor layers 103 made of a-Si are formed by a plasma CVD method. A source electrode 104 and a drain electrode 105 are formed on the a-Si layer which forms a channel portion of a TFT. The source electrode 104 also functions as a video signal line, and the drain electrode 105 is connected with a pixel electrode 110. Both of the source electrode 104 and the drain electrode 105 are formed on the same layer simultaneously. In this embodiment, the source electrode 104 or the drain electrode 105 is made of MoCr alloy. When it is necessary to lower the electric resistance of the source electrode 104 or the drain electrode 105, for example, the electrode structure which sandwiches an AlNd alloy layer between MoCr alloy layers is used.

An inorganic passivation film (insulation film) 106 is formed of an inorganic insulation film made of SiN or the like so as to cover the TFTs. The inorganic passivation film 106 particularly protects the channel portions of the TFTs from impurities. On the inorganic passivation film 106, an organic passivation film (insulation film) 107 is formed. The organic passivation film 107 also plays a role of leveling a surface of the TFT besides a role of protecting the TFT and hence, the organic passivation film 107 has a large thickness. The thickness of the organic passivation film 107 is set to a value which falls within a range from 1 µm to 4 µm.

The organic passivation film 107 is made of a photosensitive acrylic resin, silicon resin, polyimide resin or the like. It is necessary to form through holes in the organic passivation film 107 at positions where the pixel electrodes 110 and the drain electrodes 105 are connected with each other. Since the organic passivation film 107 is formed of a photosensitive film, it is possible to form the through holes in the organic passivation film 107 by exposing and developing the organic passivation film 107 per se without using a photoresist.

A common electrode (counter electrode) 108 is formed on the organic passivation film 107. The common electrode 108 is formed of an ITO (Indium Tin Oxide) film which is a transparent conductive film and is formed on the whole display region by sputtering. That is, the common electrode 108 is formed into a planar shape. After forming the common electrode 108 on the whole surface of the display region by sputtering, the common electrode 108 is removed by etching at only through-hole portions which are necessary for making the pixel electrode 110 and the drain electrode 105 conductive with each other.

An upper insulation film 109 made of SiN is formed so as to cover the common electrode 108. After forming the upper insulation film 109, through holes are formed in the upper insulation film 109 by etching. Using the upper insulation film 109 as a resist, the through holes 111 are formed by etching the inorganic passivation film 106. Thereafter, a transparent conductive film made of ITO which becomes pixel electrodes 110 later is formed by sputtering so as to cover the upper insulation film 109 and the through holes 111. The pixel electrodes 110 are formed by patterning the ITO film which is formed by sputtering. The ITO film which forms the pixel electrodes 110 is also formed on the through holes 111. In the through hole 111, the drain electrode 105 which extends from the TFT and the pixel electrode 110 are made conductive with each other so that a video signal is supplied to the pixel electrode 110.

As described later, the pixel electrode 110 is formed of a comb-teeth-shaped electrode with both ends closed. A slit 112 is formed between the comb-teeth-shaped electrodes. A predetermined potential (also referred to as a reference potential or a common potential) is applied to the common electrode 108 and a potential corresponding to a video signal is applied to the pixel electrodes 110. As shown in FIG. 1, when a potential is applied to the pixel electrode 110, lines of electric force are generated and liquid crystal molecules 113 are rotated in the direction of the lines of electric force thus controlling the transmission of light from a backlight. That is, by making use of an electric field generated due to potential difference between the common electrode 108 and the pixel electrode 110, the liquid crystal molecules 113 are driven. Since the transmission of light from the backlight can be controlled for every pixel, it is possible to form an image. Here, although an alignment film for aligning the liquid crystal molecules 113 is formed on the pixel electrode 110, the alignment film is omitted from FIG. 1.

In an embodiment explained hereinafter, the explanation is made assuming that the common electrode 108 which is formed into a planar shape is arranged on the organic passivation film 107, and the pixel electrodes 110 having comb-teeth-shaped electrodes 1101 are arranged on the upper insulation film 109. However, opposite to such an arrangement, the present invention is also applicable to a case where the pixel-electrodes 110 which are formed into a planar shape are arranged on the organic passivation film 107 and a comb-teeth-shaped common electrode 108 is arranged on the upper insulation film 109 in the same manner as the above-mentioned constitution.

Embodiment 1

Figure 2:
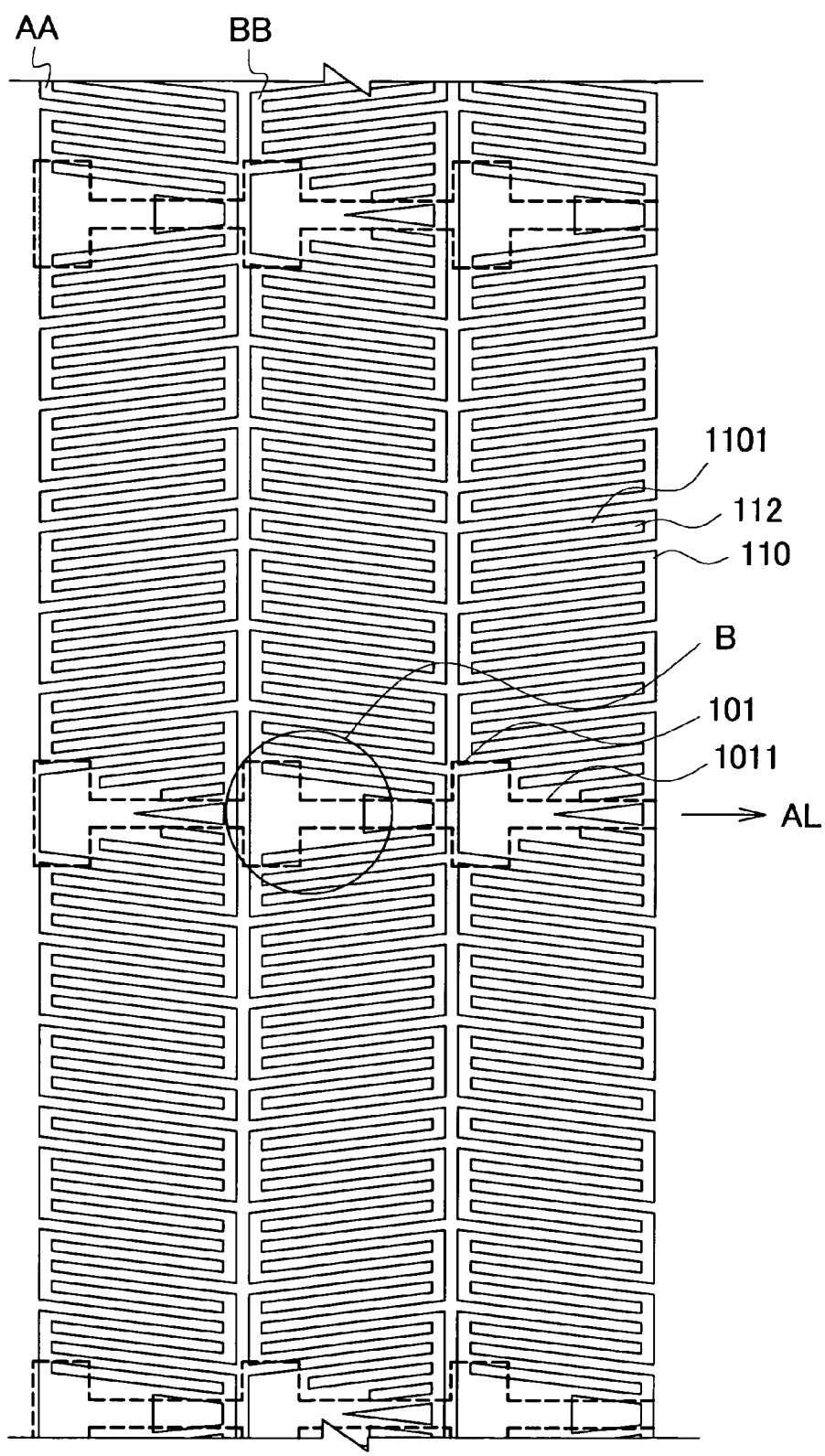
FIG. 2 is a view of the arrangement of pixels of an embodiment 1.
Figure 3:
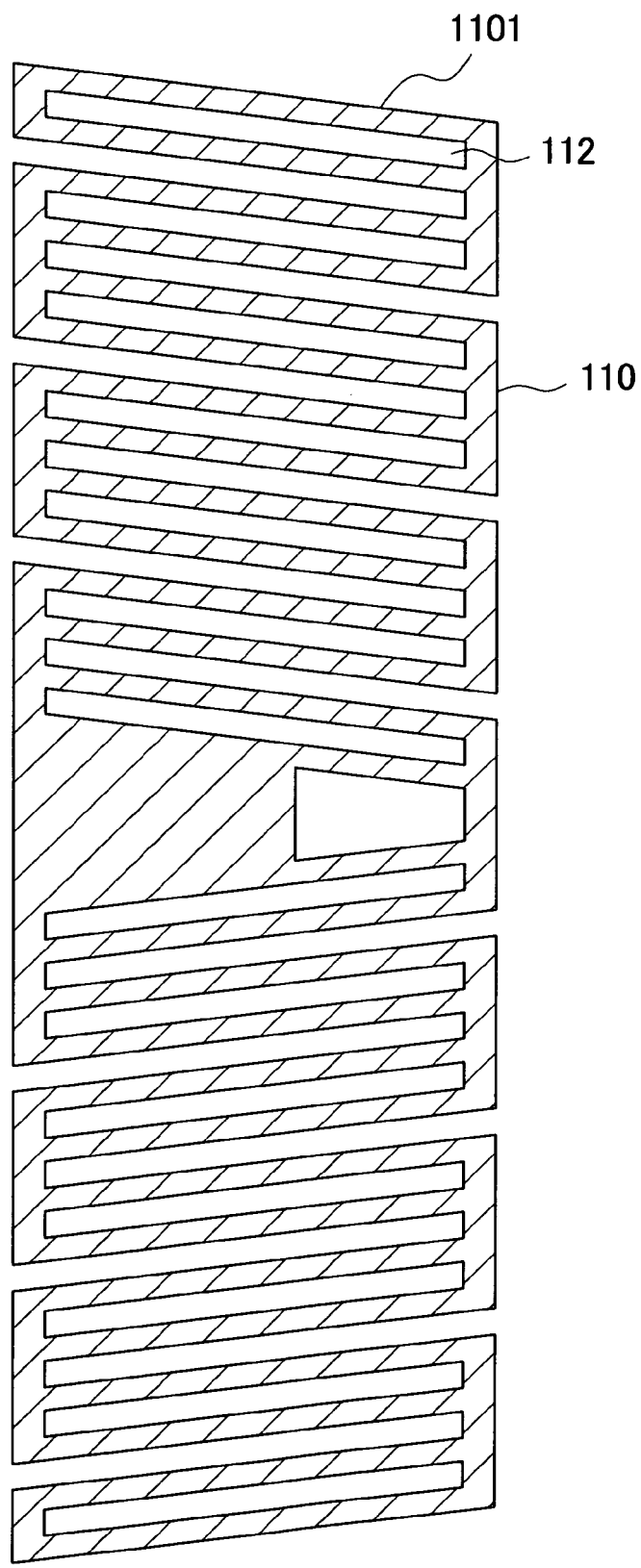
FIG. 3 is an enlarged view of a pixel electrode of the embodiment 1.
Figure 6:
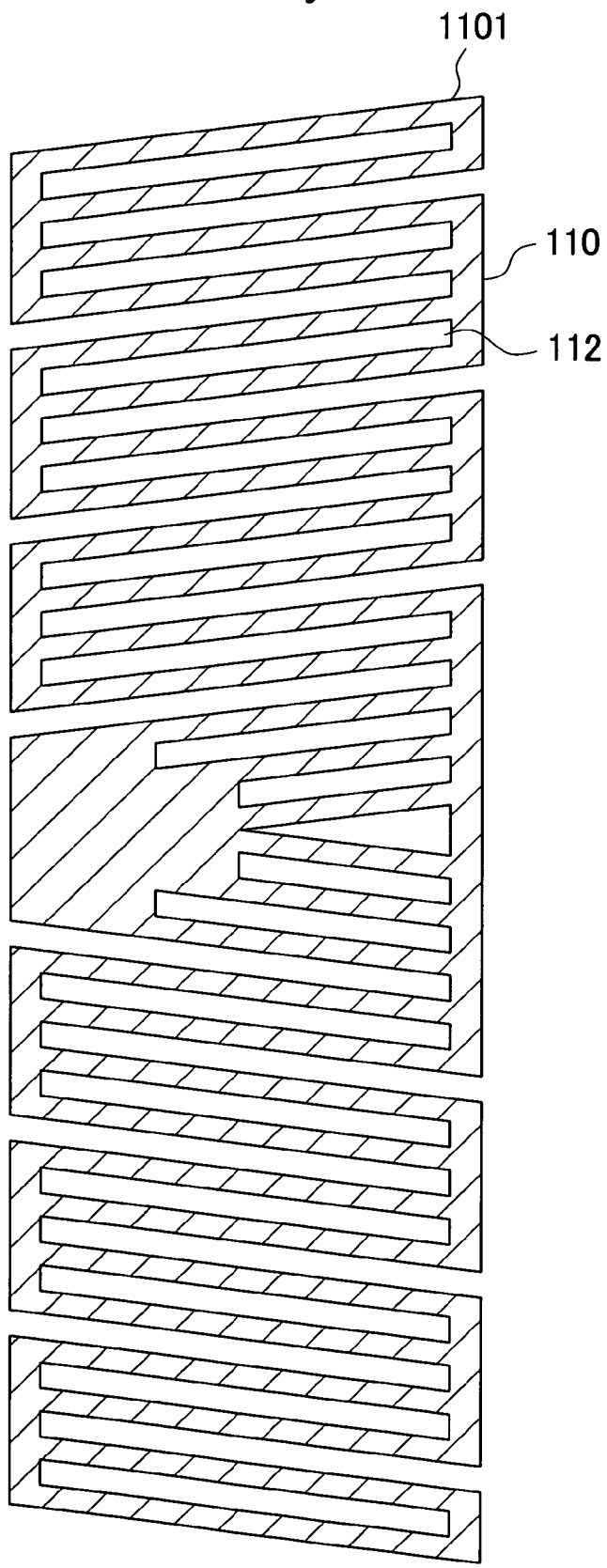
FIG. 6 is a view showing still another example of the pixel electrode of the embodiment 1.
Figure 7:
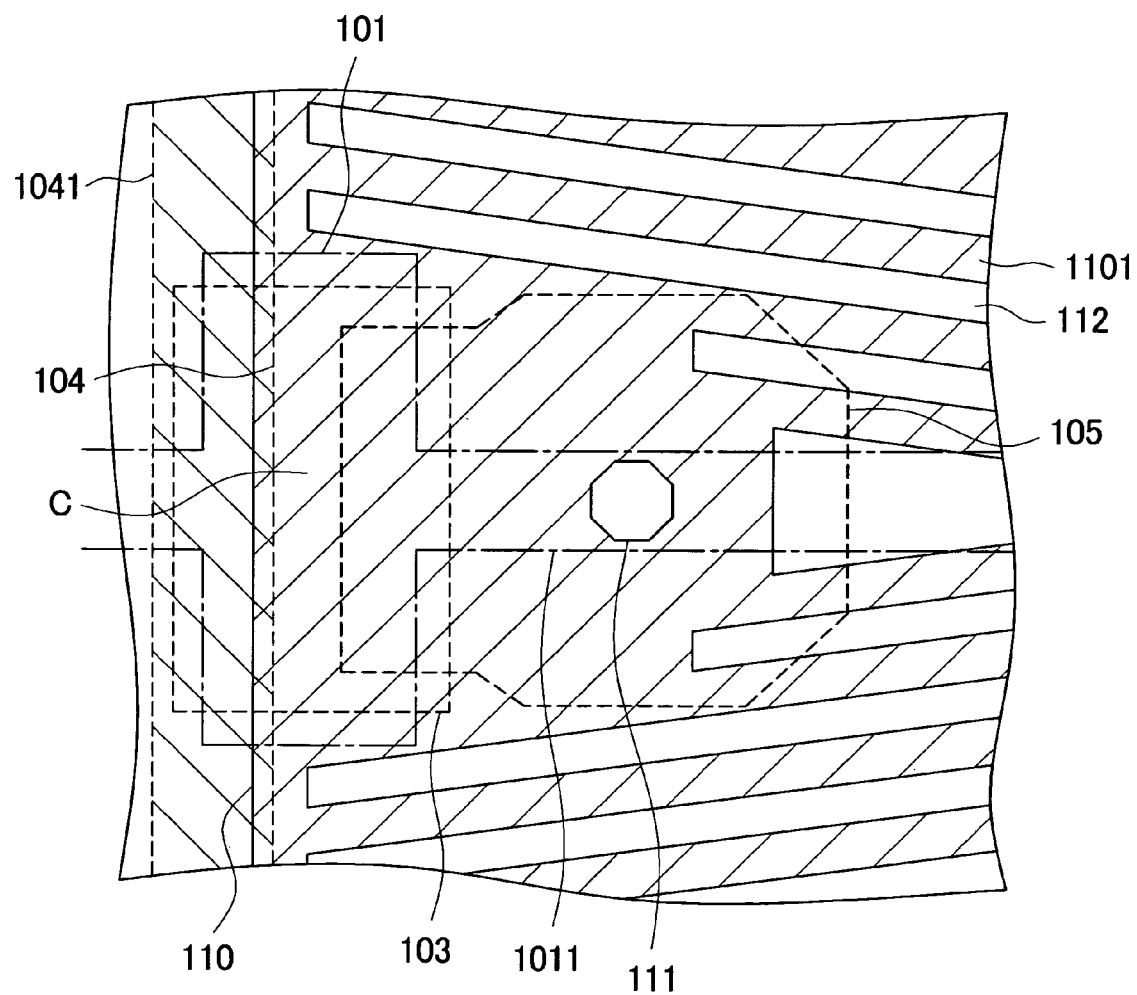
FIG. 7 is a view showing a TFT portion of the embodiment 1 in a see-through manner.

FIG. 2 is a plan view showing the arrangement of the pixels on the TFT substrate 100 of the embodiment 1. FIG. 3 is an enlarged view of a pixel AA shown in FIG. 2. FIG. 6 is an enlarged view of a pixel BB shown in FIG. 2. The pixel AA and the pixel BB are arranged in symmetry. FIG. 7 is an enlarged view showing a portion B shown in FIG. 2 in a see-through manner.

In FIG. 2, to prevent the drawing from becoming complicated, only the pixel electrodes 110 and the scanning line 1011 are shown. In FIG. 2, the pixel is formed in a laterally-extending trapezoidal shape. Conventionally, the pixel is defined by a region surrounded by video signal lines 1041 and scanning lines 1011. However, in this embodiment, the pixel is defined by the pixel electrode 110 per se. Further, the pixels are arranged in the longitudinal direction such that the pixel AA and the pixel BB are formed continuously thus providing the packed structure. Further, the pixels are also arranged in the lateral direction such that the pixel AA and the pixel BB are formed continuously thus providing the packed structure.

Upper and lower boundaries of the pixel in the longitudinal direction are defined neither by the scanning lines nor by the capacitive lines. That is, the light blocking films are not present on the upper and lower boundaries of the pixel. Accordingly, upper and lower ends of the pixel can be also used for forming the image and hence, the transmissivity can be increased whereby a liquid crystal display device having high brightness can be realized.

As shown in FIG. 2, a profile of each pixel is formed in a laterally-extending trapezoidal shape. In FIG. 2, slits 112 are formed along sides of the trapezoidal shape. In other words, the comb-teeth-shaped electrodes 1101 are formed with the same inclination as the sides of the trapezoidal shape. Accordingly, the inclination of the pixel electrode 110 becomes opposite to each other between an upper half region and a lower half region of the pixel electrode 110. Due to such constitution, as explained hereinafter, it is possible to eliminate the directivity of a viewing angle.

When a potential corresponding to a video signal is applied to the pixel electrode 110, as explained in conjunction with FIG. 1, lines of electric force is generated from the pixel electrode 110 to the planar common electrode 108 arranged below the pixel electrode 110 through the slit 112 and via the upper insulation film 109, and liquid crystal is rotated along the lines of electric force and hence, light from a backlight which passes through the pixel is controlled thus forming an image.

In this embodiment, the direction of alignment axis of liquid crystal is the lateral direction as indicated by an arrow AL in FIG. 2. When a potential corresponding to a video signal is applied to the pixel electrode 110, since the direction of the comb-teeth-shaped pixel electrode 110 is opposite to each other, the rotational direction of liquid crystal differs from each other between an upper side and a lower side of the pixel electrode 110. Accordingly compared to a case in which the liquid crystal molecules 113 are rotated only in a specified direction, it is possible to reduce the directivity of viewing angle.

On the other hand, between the upper portion and the lower portion of the pixel, the inclination of the comb-teeth-shaped electrode 1101 is opposite to each other and hence, a region which does not contribute to the formation of an image is formed at the center of the pixel in the longitudinal direction. In this embodiment, by extending the scanning line 1011 over this portion, the reduction of transmissivity is prevented as the whole pixel. In this embodiment, the scanning line 1011 extends linearly in the lateral direction.

FIG. 3 is an enlarged view of the pixel electrode 110 of the pixel AA in FIG. 2. FIG. 3 shows only the pixel electrode 110. In FIG. 3, the slits 112 of the pixel electrode 110 have end portions thereof opened for every one other slit (at a rate of one slit for every two slits). That is, the slit 112 having both ends thereof closed and the slit 112 having only one-side end portion thereof opened are alternately arranged next to each other in parallel. However, the opened end portions of the slits 112 are formed alternately on different sides of the trapezoidal pixel electrode 110. Accordingly, within one pixel electrode 110, all comb-teeth-shaped electrodes 1101 are made conductive with each other. In a portion where a distal end is opened, there is no possibility that a region where liquid crystal cannot be controlled due to a potential of the pixel electrode 110 caused by a peculiar electric field (hereinafter referred to as an abnormal domain) occurs. Accordingly, the transmissivity of the pixel can be enhanced correspondingly.

The constitution that one end of the slit 112 is opened implies that an electric field generated by the comb-teeth-shaped electrodes 1101 is easily influenced by other electrode or a phenomenon referred to as a so-called pushed domain which occurs when the liquid crystal display device is pushed from the outside is liable to easily occur. However, the number of opened portions of the slits 112 on one side of the pixel electrode 110 is one for every four slits and hence, the influence of other electrode or the so-called pushed domain is extremely small.

On the other hand, in FIG. 3, four comb-teeth-shaped electrodes 1101 have one ends thereof connected in common and hence, even when the disconnection occurs at one of these comb-teeth-shaped electrodes 1101, it is possible to eliminate a case that a video signal is not supplied to the pixel electrode 110. This structure is extremely important to ensure the reliability of the pixel electrode 110.

Figure 4:
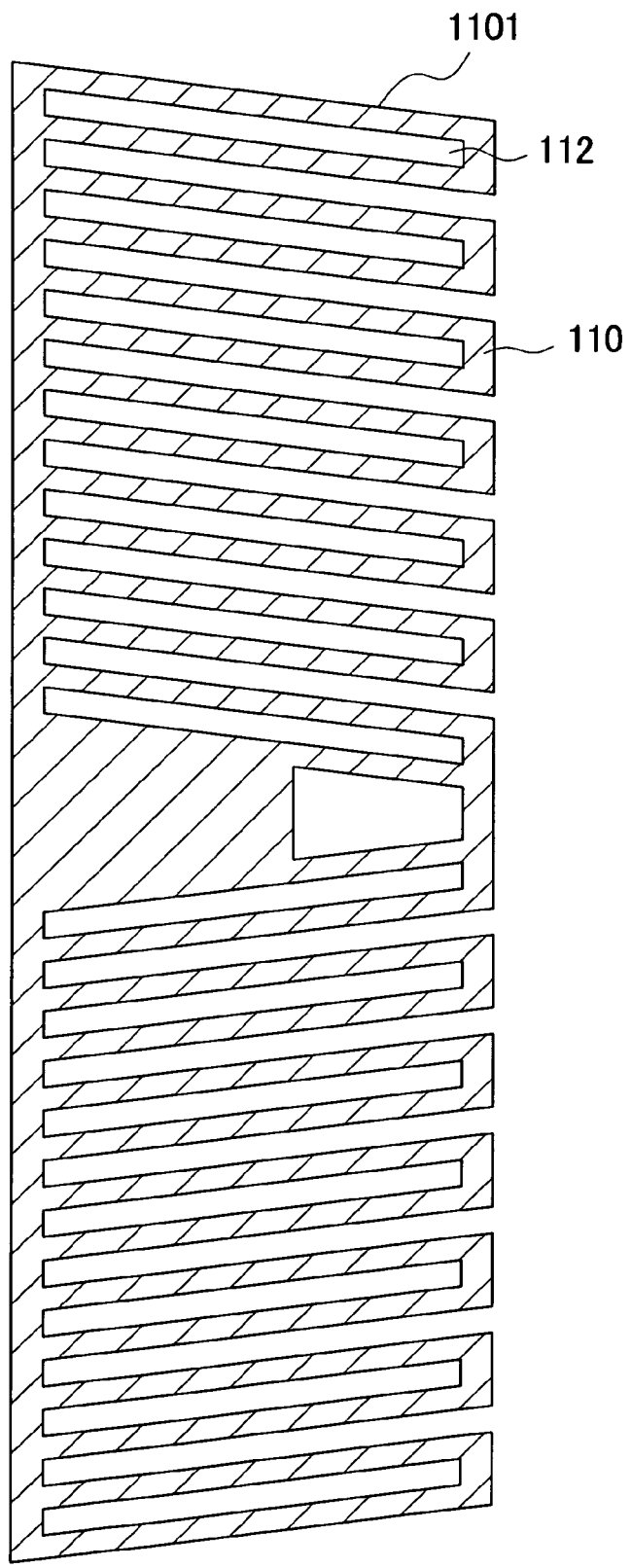
FIG. 4 is a view showing another example of the pixel electrode of the embodiment 1.
Figure 5:
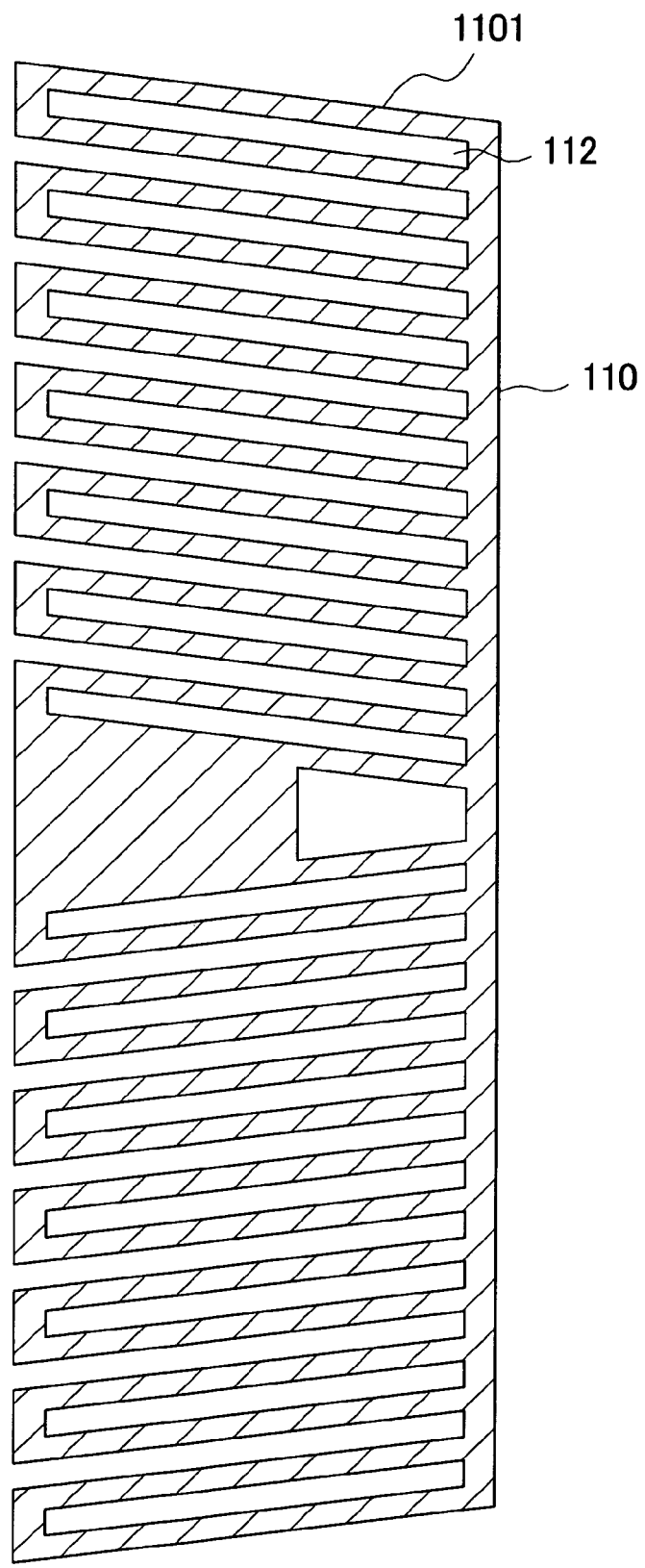
FIG. 5 is a view showing still another example of the pixel electrode of the embodiment 1.

FIG. 4 shows a modification of the pixel electrode 110 shown in FIG. 3. In FIG. 4, all of the pixel electrodes 110 are connected with each other on a left side of the pixel electrode 110, while opened portions of the comb-teeth-shaped electrodes 1101 (slits 112) and closed portions of the comb-teeth-shaped electrodes 1101 (slits 112) are alternately formed on a right side of the pixel electrode 110. FIG. 5 shows another modification of the pixel electrode 110 shown in FIG. 3. In FIG. 5, all of the pixel electrodes 110 are connected with each other on a right side of the pixel electrode 110, while opened portions of the comb-teeth-shaped electrodes 1101 (slits 112) and closed portions of the comb-teeth-shaped electrodes 1101 (slits 112) are alternately formed on a left side of the pixel electrode 110. The example shown in FIG. 4 and the example shown in FIG. 5 also acquire advantageous effects substantially equal to the advantageous effects shown in FIG. 3.

FIG. 6 is an enlarged view of the pixel electrode 110 of the pixel BB in FIG. 2. FIG. 6 shows only the pixel electrode 110. The pixel electrode 110 shown in FIG. 6 has a symmetrical relationship with the pixel electrode 110 shown in FIG. 3, and acquires an advantageous effect substantially equal to the advantageous effect acquired by the pixel electrode 110 shown in FIG. 3. Further, the reliability of the pixel electrode 110 against the disconnection is substantially equal to the reliability of the pixel electrode 110 shown in FIG. 3. Here, the pixel electrode 110 shown in FIG. 6 may be configured such that, in the same manner as the pixel electrode 110 shown in FIG. 4 or FIG. 5 corresponding to the pixel electrode 110 shown in FIG. 3, all comb-teeth-shaped electrodes 1101 are connected with each other only on a left side or a right side of the comb-teeth-shaped electrode 1101, and opened portions and closed portions of the comb-teeth-shaped electrodes 1101 (slits 112) are formed alternately on an opposite side.

As shown in FIG. 3 to FIG. 6, according to this embodiment, it is no more necessary to make a shape of the pixel electrode 110 complicated. Accordingly, there is no possibility that a manufacturing yield ratio is lowered. The gist of the present invention lies in the enhancement of transmissivity without lowering reliability against the disconnection and also without lowering the manufacturing yield ratio. Further, due to the presence of the slits 112 having both ends thereof closed among the slits 112, this embodiment can effectively cope with the pushed domain.

FIG. 7 is an enlarged see-through view of a portion B in FIG. 2. In FIG. 7, the gate electrode 101 and the scanning line 1011 are indicated by a chained line. A portion of the scanning line 1011 where a width of the scanning line 1011 is enlarged forms the gate electrode 101. The semiconductor layer 103 indicated by a dotted line is formed on the gate electrode 101 by way of the gate insulation film 102 not shown in the drawing. A shape of the semiconductor layer 103 in FIG. 7 is a rectangular shape. The source electrode 104 is arranged on a left side of the semiconductor layer 103. In this case, the video signal line 1041 indicated by hatching also functions as the source electrode 104.

The drain electrode 105 indicated by a dotted line is arranged on a right side of the semiconductor layer 103. The drain electrode 105 faces the source electrode 104. Although a portion of the drain electrode 105 which overlaps with the semiconductor layer 103 has a rectangular shape, a further right extending portion of the drain electrode 105 has a pseudo octagonal shape. Such constitution is provided for making the drain electrode 105 larger than the through hole formed in the organic passivation film 107. Here, in FIG. 7, for preventing the drawing from becoming complicated, a shape of the through hole formed in the organic passivation film 107 and the upper insulation film 109 is not described in the drawing.

In FIG. 7, a gap C of a portion where the source electrode 104 and the drain electrode 105 face each other forms a channel portion of the TFT. At an approximately center portion of the drain electrode 105 which is formed in a pseudo octagonal shape, a through hole 111 which is formed in the inorganic passivation film 106 having a pseudo octagonal planar shape is provided. The through hole 111 is formed in the inside of the through hole formed in the upper insulation film 109 and the organic passivation film 107.

On the source electrode 104 or the drain electrode 105, the pixel electrode 110 is formed by way of the inorganic passivation film 106, the organic passivation film 107, the common electrode 108 and the upper insulation film 109. Here, the common electrode 108 is formed in a planar shape except for a portion thereof around the through hole and hence, the common electrode 108 is not shown in FIG. 7.

As shown in FIG. 7, the slit 112 is formed between the comb-teeth-shaped electrodes 1101. When a potential is applied to the comb-teeth-shaped electrode 1101, lines of electric force extend toward the lower common electrode 108 from the comb-teeth-shaped electrode 1101 through the slit 112, and some lines of electric force rotate the liquid crystal molecules 113 on boundaries of the slit 112 and the comb-teeth-shaped electrode 1101 thus controlling light from the backlight so as to form an image.

Figure 8:
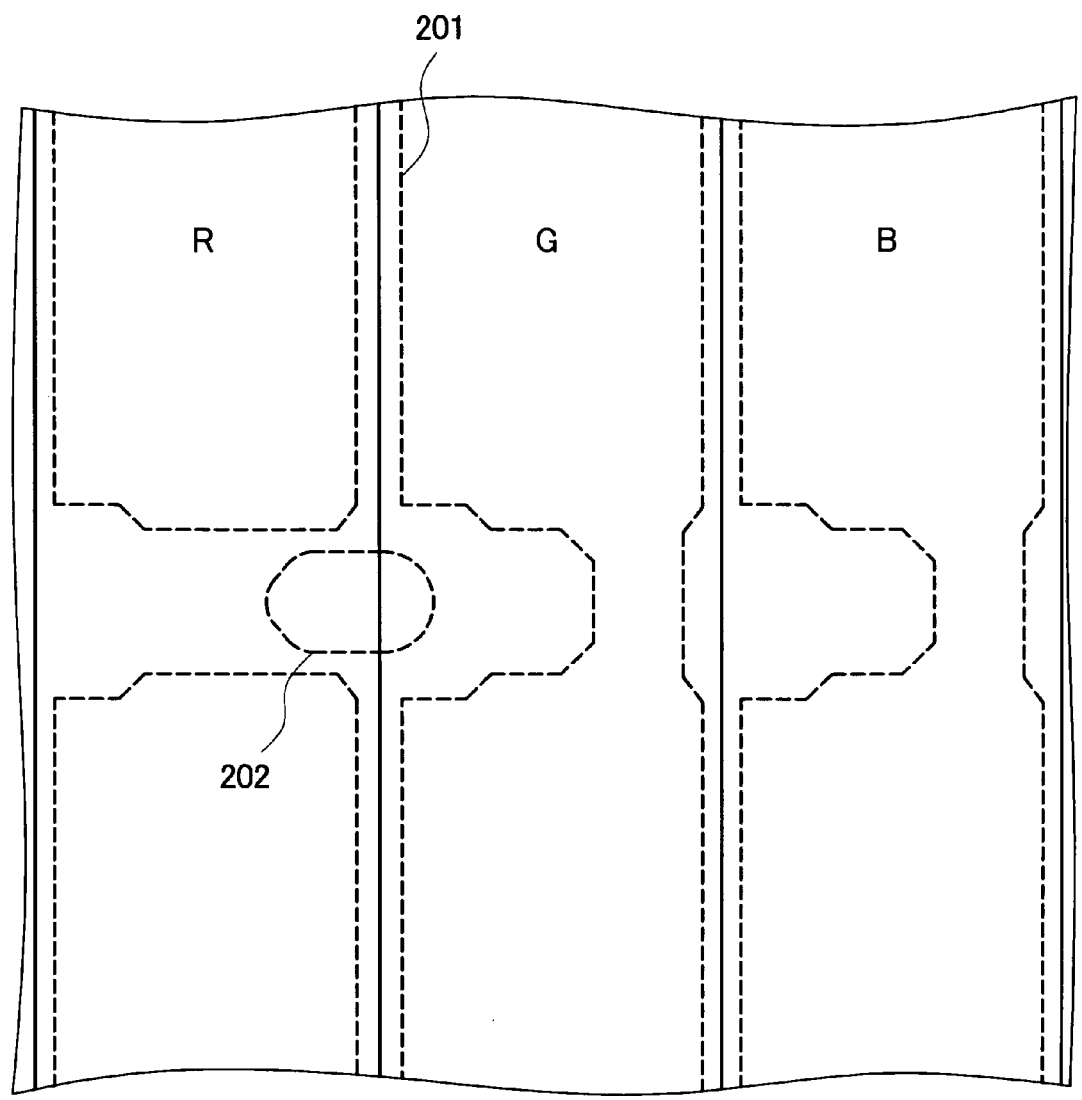
FIG. 8 is a plan view of a counter substrate as viewed from a TFT substrate side.

FIG. 8 is a view of the counter substrate 200 corresponding to the TFT substrate 100 shown in FIG. 2 as viewed from a TFT substrate 100 side. Although the color filters amounting approximately one pixel in the longitudinal direction are shown in FIG. 8, in an actual model, the red filter R, the green filter G and the blue filter B are formed in a stripe shape. In the pixel arrangement shown in FIG. 2, the pixels which display the same color are arranged in the longitudinal direction. Accordingly, it is unnecessary to consider color mixing in the longitudinal direction.

In FIG. 8, the light blocking films 201 which are formed on the counter substrate 200 are indicated by a dotted line. The light blocking films 201 are formed on a glass substrate side compared to the color filter and hence, the light blocking films 201 are indicated by dotted lines. The light blocking films 201 are formed of a black resin and contribute to the enhancement of contrast of an image. The light blocking films 201 may be made of metal such as Cr.

The light blocking films 201 are formed in a stripe shape in the longitudinal direction along boundaries of the color filters. According to the present invention, some of the light blocking films 201 is formed in the lateral direction only in regions corresponding to portions of the TFT substrate 100 where the TFTs are formed and in regions of the TFT substrate 100 where the drain electrodes 105 are formed. That is, in this embodiment, there are some light blocking films 201 in the lateral direction which are not bridged to the light blocking films 201 in the longitudinal direction. On the other hand, the light blocking films 201 having the conventional structure are continuously formed along the boundaries of the pixels in the lateral direction. That is, all of the light blocking films 201 in the longitudinal direction are bridged to each other. Due to such constitution, in the present invention, an area in which the light blocking films 201 of the counter substrate 200 are formed is relatively small compared to the conventional liquid crystal display device. Accordingly, in the present invention, it is possible to increase the brightness by reducing blocking of light from the backlight.

In FIG. 8, with respect to the green filter G and the blue filter B, the light blocking films 201 in the lateral direction are not configured to bridge the light blocking films 201 in the longitudinal direction and are cut from each other. In such a portion, the scanning line 1011 extends on the TFT substrate 100 and hence, blocking of light from the backlight is performed by the scanning line 1011. Due to such constitution, the transmissivity can be increased.

On the other hand, with respect to the red filter R, the light blocking film 201 are bridged to each other. That is, the light blocking films 201 in the longitudinal direction are bridged to each other. This is because the columnar spacer 202 is formed on the light blocking film 201 in the red filter R. The columnar spacer 202 is provided for holding the distance between the TFT substrate 100 and the counter substrate 200 to a predetermined value. The columnar spacer 202 shown in FIG. 8 has a laterally elongated oblong circle.

To hold the distance between the TFT substrate 100 and the counter substrate 200 to a fixed value, it is necessary to ensure a cross-sectional area of the columnar spacer 202 to some extent. By elongating the columnar spacer 202 in the lateral direction, it is possible to ensure the cross-sectional area of the columnar spacer 202 without increasing a width of the light blocking film 201 in the longitudinal direction, that is, without reducing the transmissivity. Here, the shape of the columnar spacer 202 is not limited to an oblong circle and the columnar spacer 202 may be formed into any shape such as an elliptical shape, a rectangular shape as long as being long sideways.

Further, in a boundary portion of two pixels arranged in the longitudinal direction, that is, in a boundary portion corresponding to the oblique side of the laterally-extending trapezoidal shape, the light blocking film 201 is not formed. Due to such constitution, a numerical aperture of the pixel can be further enhanced. Here, two pixels arranged in the longitudinal direction correspond to color filters having the same color and hence, there arises no possibility of the occurrence of color mixing.

Figure 9:
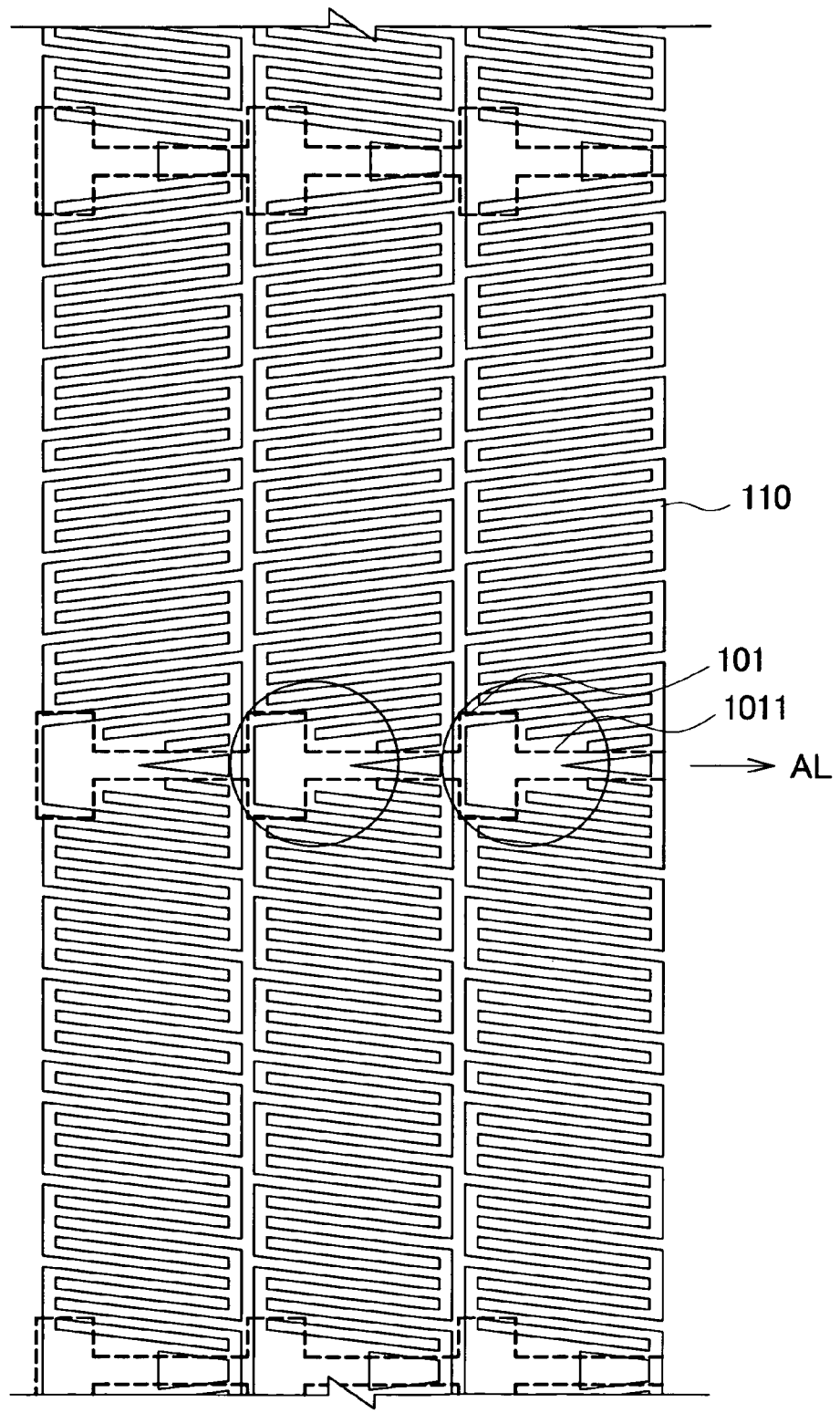
FIG. 9 is a view of the arrangement of pixels according to another modification of the embodiment 1.

FIG. 9 shows the arrangement of pixels according to another modification of the embodiment 1. The constitution which makes the modification shown in FIG. 9 different from the embodiment 1 shown in FIG. 2 lies in that trapezoidal pixels which are directed in the same direction are arranged in the lateral direction. On the other hand, in the longitudinal direction, the pixel electrode 110 shown in FIG. 3 and the pixel electrode 110 shown in FIG. 6 are alternately arranged thus providing the packed structure. Accordingly, the constitution shown in FIG. 9 also adopts the packed structure in the longitudinal direction as well as in the lateral direction in the same manner as the constitution shown in FIG. 2.

As shown in FIG. 9, also in this modification, the pixel electrodes 110 shown in FIG. 3 and the pixel electrodes 110 shown in FIG. 6 in the embodiment 1 are used and these pixel electrodes 110 are arranged in the packed structure and hence, this embodiment also can acquire advantageous effects substantially equal to the advantageous effects of the embodiment 1.

It is needless to say that this modification may adopt the pixel electrodes 110 shown in FIG. 4 or FIG. 5.

The advantageous effects acquired by making the end portions of the slits 112 open-ended in the embodiment 1 are not limited to the trapezoidal pixels, and such advantageous effects can be also acquired by applying the present invention to the pixels having a usual rectangular shape.

Embodiment 2

Figure 10:
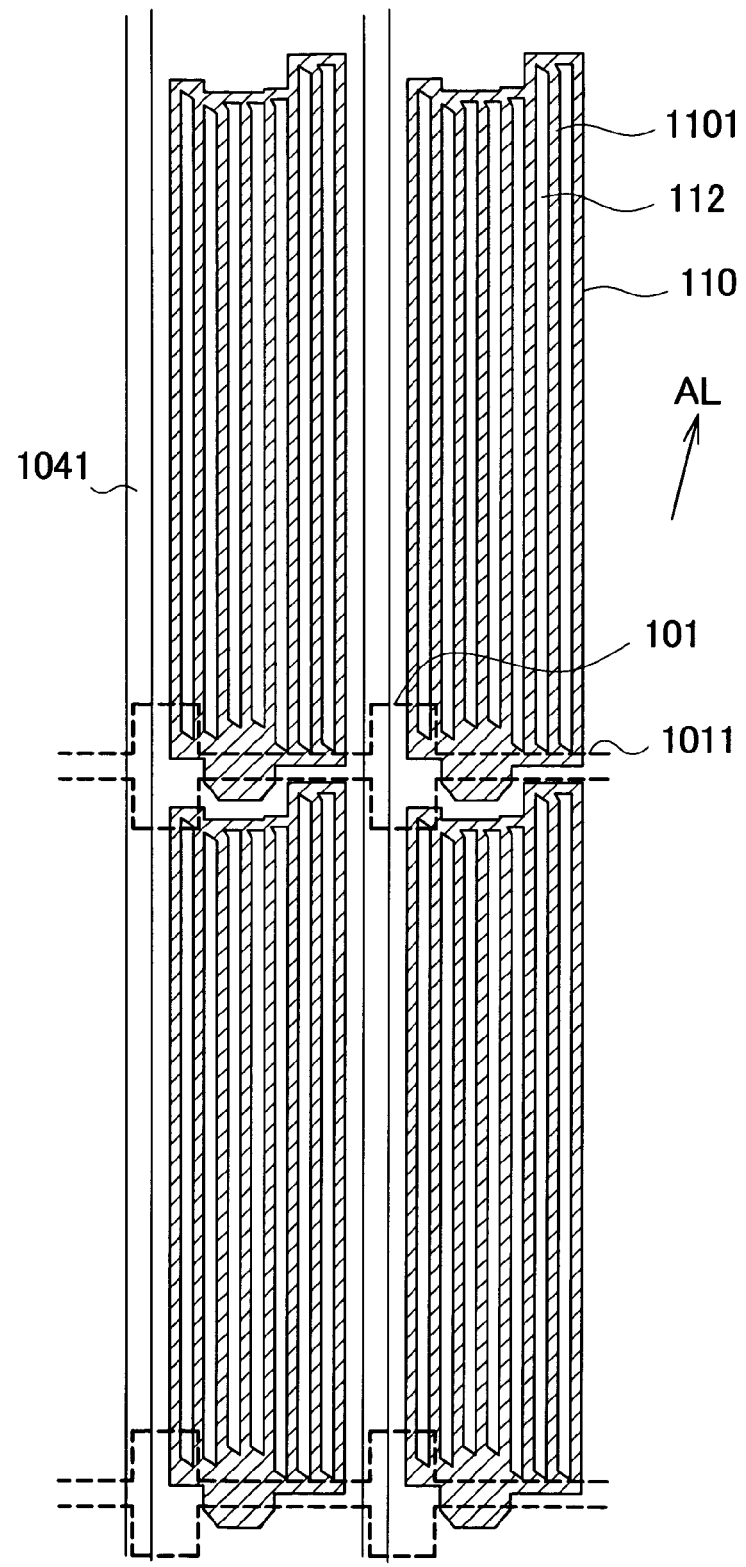
FIG. 10 is a view of the arrangement of pixels of an embodiment 2.
Figure 11:
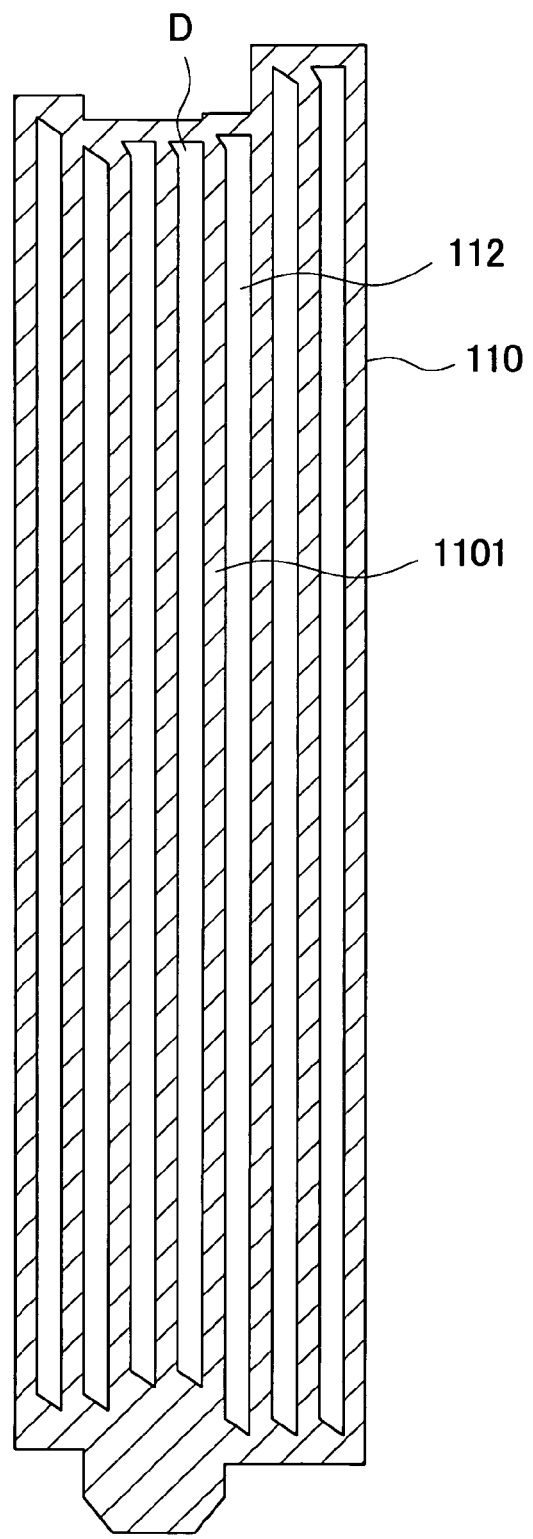
FIG. 11 is an enlarged view of a pixel electrode of the embodiment 2.
Figure 12:
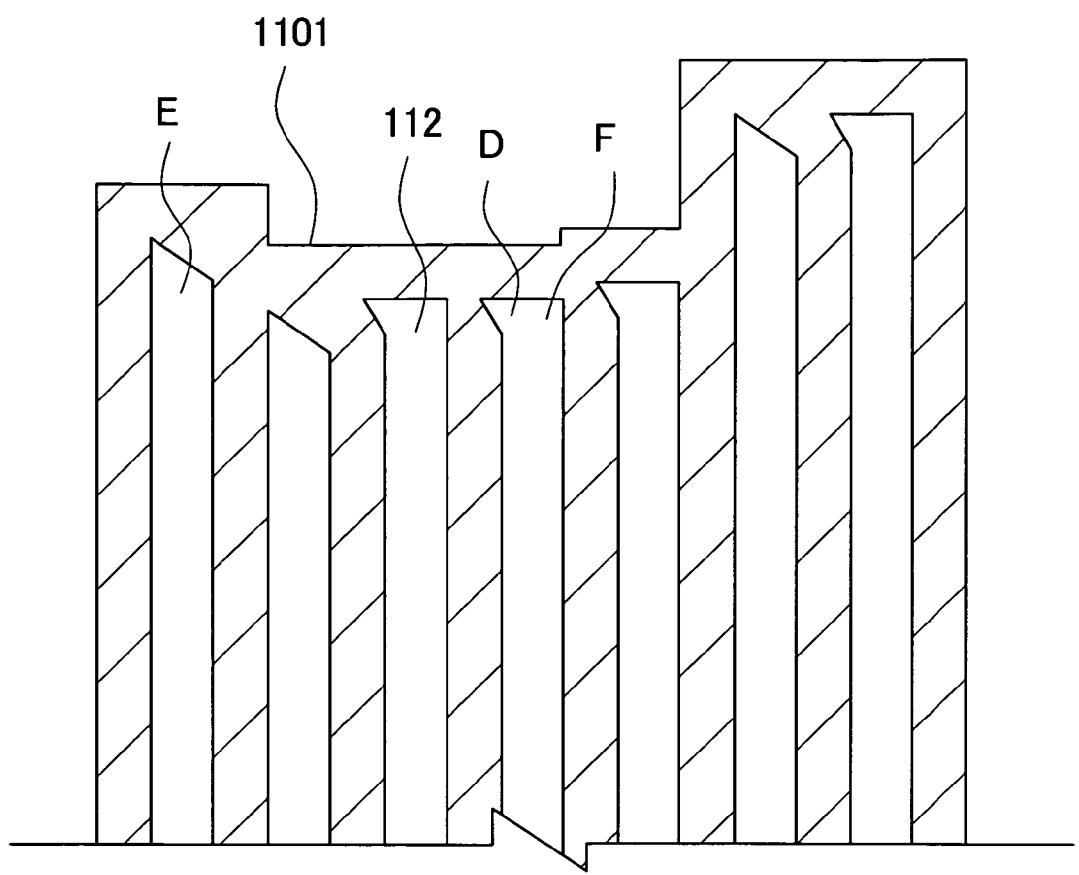
FIG. 12 is an enlarged view of a distal end portion of a comb-teeth-shaped electrode of the embodiment 2.

FIG. 10 is a plan view showing the arrangement of pixels of an embodiment 2 of the present invention. FIG. 10 shows the arrangement of the pixels, FIG. 11 is an enlarged view of a pixel electrode 110, and FIG. 12 is an enlarged view of an end portion of the pixel electrode 110. In FIG. 10, the pixels are defined or partitioned by scanning lines 1011 and video signal lines 1041. The pixel electrode 110 has a rectangular shape (however, being partially uneven around a through hole), wherein comb-teeth-shaped electrodes 1101 (slits 112) extend in a longitudinal direction and have distal ends thereof closed. Also in the arrangement of the pixels shown in FIG. 10, the cross-sectional constitution of the vicinity of the TFT is substantially equal to the cross-sectional constitution of the vicinity of the TFT in FIG. 1. In FIG. 10, the alignment direction of liquid crystal is a direction indicated by an arrow AL. Here, although the alignment direction of liquid crystal in the rectangular pixel electrode 110 is slightly inclined from the long-axis direction in FIG. 10, the alignment direction is not limited to such a direction and may be any direction other than the short-axis direction of the pixel electrode 110.

Even when the pixel electrode 110 has such a shape, there is a region where an electric field is directed in an abnormal direction at a portion where a distal end of the comb-teeth-shaped electrode 1101 (slit 112) is closed, and an abnormal domain is generated in such a portion. Such an abnormal domain decreases transmissivity. To eliminate this abnormal domain, in this embodiment, an electrode shape of a distal end portion of the comb-teeth-shaped electrode 1101 has a particular shape as shown in FIG. 11.

As shown in FIG. 11, a cut-off portion D which is integrally formed with the slit 112 is formed in a distal end of the comb-teeth-shaped electrode 1101. Due to such a cut-off portion D, the abnormal domain is stored in the cut-off portion D thus allowing the slit 112 including an end portion except for the cut-off portion D to contribute to a display. A position which overlaps with the pixel electrode 110 (comb-teeth-shaped electrode 1101) is originally a position to which an electric field is hardly formed and hence, even when the abnormal domain is moved to the position, the lowering of transmissivity at such a position does not occur. Accordingly, the transmissivity is not lowered even at a distal end of the comb-teeth-shaped electrode 1101 and hence, the transmissivity at the distal end portion of the slit 112 can be enhanced. Here, the slit 112 has both ends thereof closed and hence, this structure can also cope with a pushed domain.

FIG. 12 is an enlarged view of a shape of the distal end portions of the comb teeth of the pixel electrode 110 shown in FIG. 11. In FIG. 12, a cut-off portion D having an inclination is formed in a distal end of the comb-teeth-shaped electrode 1101. The presence of such a cut-off portion is disadvantageous for the disconnection of the comb-teeth-shaped electrode 1101. However, assuming that the disconnection occurs in one portion of the comb-teeth-shaped electrode 1101, according to this constitution, the comb teeth is connected with each other at another portion, that is, a lower portion of the comb-teeth-shaped electrode 1101 shown in FIG. 11 and hence, there is no possibility that a video signal is not applied to the comb teeth. That is, the cut-off portion D which is integrally formed with the slit 112 is formed in one end portion side of the comb-teeth-shaped electrode 1101, and the comb-teeth-shaped electrode 1101 at one end portion has a width smaller than a width of the comb-teeth-shaped electrode 1101 at another end portion. Accordingly, while the portion of the comb-teeth-shaped electrode 1101 having a narrow width is liable, to be easily disconnected, the portion of the comb-teeth-shaped electrode 1101 opposite to the portion of the comb-teeth-shaped electrode 1101 having a narrow width ensures a large width so that the comb-teeth-shaped electrode 1101 is hardly disconnected.

Further, assuming that both ends of the comb-teeth-shaped electrode 1101 are disconnected, a video signal is not supplied to merely such one disconnected comb-teeth-shaped electrode 1101 and the whole pixel does not become defective. Accordingly, the pixel of this embodiment can maintain high reliability against the disconnection.

In FIG. 12, with respect to the comb-teeth-shaped electrode 1101, a side (second side in the longitudinal direction) opposite to the side (first side in the longitudinal direction) where the cut-off portion D is formed with the slit 112 sandwiched therebetween is formed in a straight shape without being bent. That is, as shown in FIG. 12, a portion F which constitutes a corner portion of the slit is formed in a right-angled shape. By forming the portion F in a right-angled shape, the transmissivity of the portion can be enhanced. Due to the relationship with the an alignment axis of the liquid crystal, the enhancement of the transmissivity due to the formation of the cut-off portion D in the comb-teeth-shaped electrode appears in the portion F.

In FIG. 12, no cut-off portion is formed in an outermost portion of the comb-teeth-shaped electrode 1101 and an inclined portion is formed by increasing an area of the comb-teeth-shaped electrode 1101. This constitution is provided for decreasing a potential of the disconnection of the comb-teeth-shaped electrode 1101 at the outermost portion. Although the transmissivity of the pixel at such a portion is decreased, the decrease of the transmissivity appears only in the outermost portion and the vanity of the outermost portion and hence, the influence of the portion on the transmissivity is small.

Figure 13:
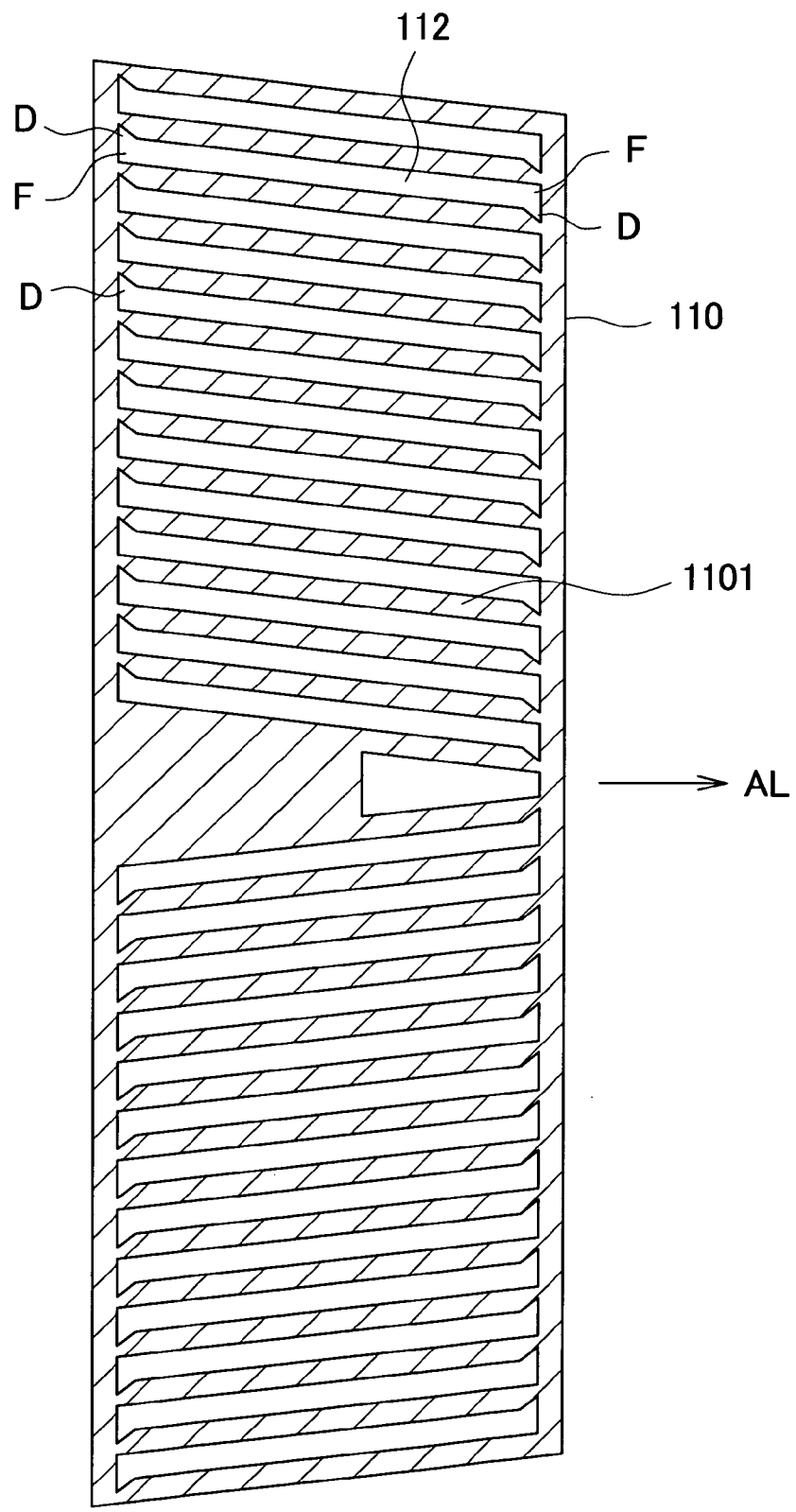
FIG. 13 is an enlarged view of the pixel electrodes according to another modification of the embodiment 2.

FIG. 13 is a plan view of the pixel electrode 110 showing a second modification of this embodiment. The pixel electrode 110 shown in FIG. 13 has a laterally-extending trapezoidal shape, and a profile of the pixel electrode 110 is substantially equal to a profile of the corresponding pixel electrode 110 shown in FIG. 3. Further, the arrangement of the pixels is substantially equal to the corresponding arrangement of the pixels shown in FIG. 2 and hence, the arrangement of the pixels is omitted. That is, also in this embodiment, the pixels adopt the packed arrangement in the longitudinal direction as well as in the lateral direction. The technical feature of the arrangement of the pixel electrodes 110 in this embodiment is exactly same as the technical feature of the arrangement of the pixel electrodes 110 explained in conjunction with the embodiment 1. Further, an alignment axis of liquid crystal on a TFT substrate 100 is a direction indicated by symbol AL in FIG. 13. The constitution which makes the pixel electrode 110 shown in FIG. 13 different from the pixel electrode 110 shown in FIG. 3 lies in a shape of the comb-teeth-shaped electrode 1101. Although FIG. 13 shows only the pixel corresponding to the pixel of the first embodiment shown in FIG. 3, a pixel shape corresponding to the pixel shape shown in FIG. 6 appears in symmetry with the pixel shape shown in FIG. 13 and hence, the pixel shape corresponding to the pixel shape shown in FIG. 6 is omitted.

In the pixel constitution shown in FIG. 13, all distal ends of the comb-teeth-shaped electrodes 1101 (slits 112) are closed by connection portions. That is, different from the pixel constitution shown in FIG. 3, the comb-teeth-shaped electrodes 1101 have no open ends. The technical feature of the pixel constitution shown in FIG. 13 lies in that, as in the case of the modification 1 of this embodiment, a cut-off portion D having inclination is formed in a distal end of the comb-teeth-shaped electrode 1101. Due to such a cut-off portion D, the abnormal domain can be stored in the cut-off portion D formed in the distal end of the comb-teeth-shaped electrode 1101 thus allowing the slit 112 including distal end thereof also to contribute to a display. That is, the transmissivity of the pixel can be enhanced. A corner portion F of the slit 112 which faces the cut-off portion D shown in FIG. 13 is formed in a right-angled shape. One of the largest technical features of the present invention lies in the enhancement of the transmissivity at the corner portion F due to the presence of the cut-off portion D.

This embodiment is characterized in that due to the trapezoidal arrangement of the pixel electrode 110, as explained in conjunction with the embodiment 1, the area of the light blocking film can be minimized thus enhancing the transmissivity and, at the same time, reducing the directivity of a viewing angle. In addition to these advantageous effects, an abnormal domain generated in the distal end of the comb-teeth-shaped electrode 1101 (slit 112) is moved to the inside of the cut-off portion D thus enhancing the transmissivity of the pixel.

Figure 14:
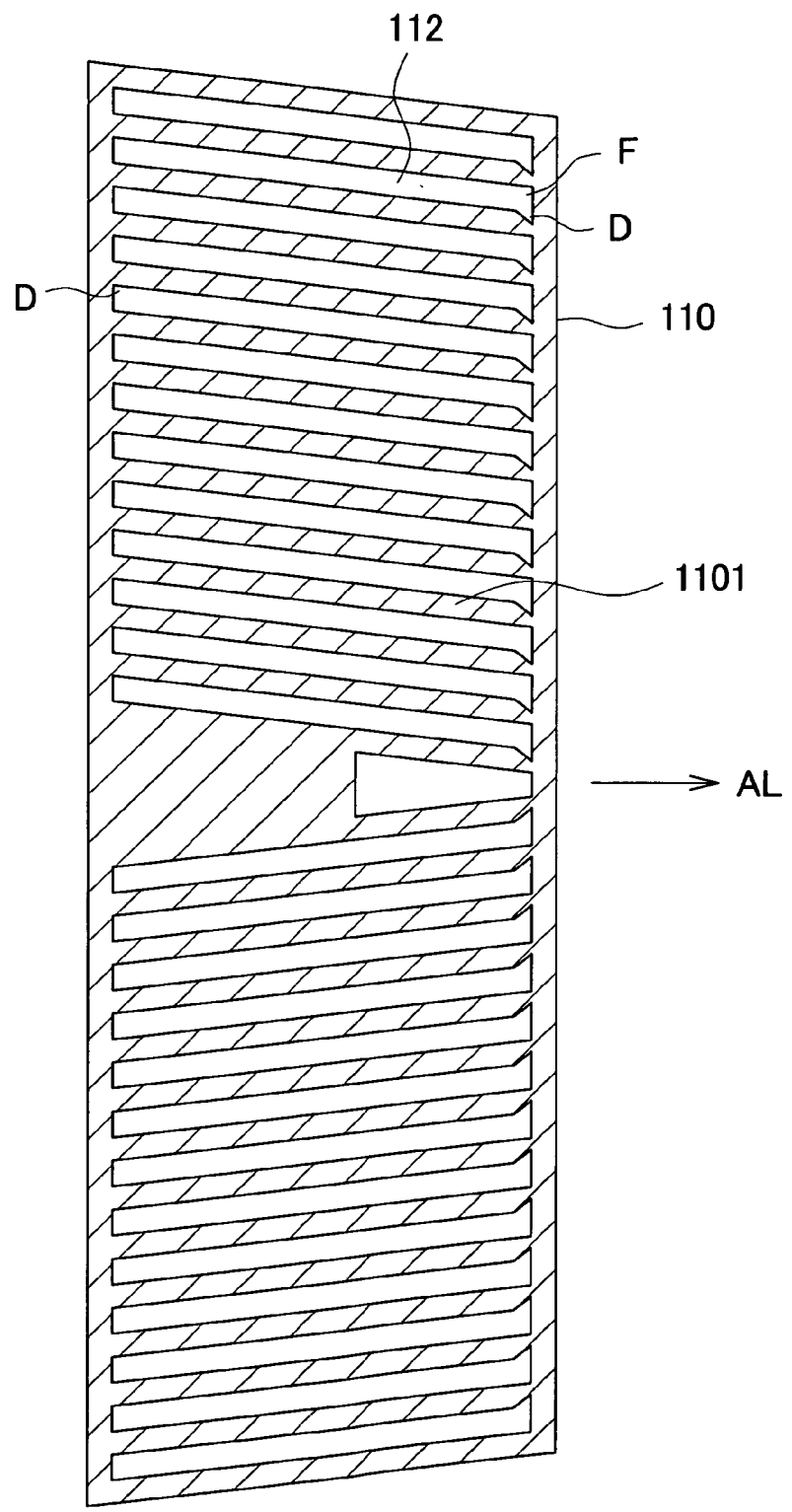
FIG. 14 is an enlarged view of the pixel electrodes according to still another modification of the embodiment 2.
Figure 15:
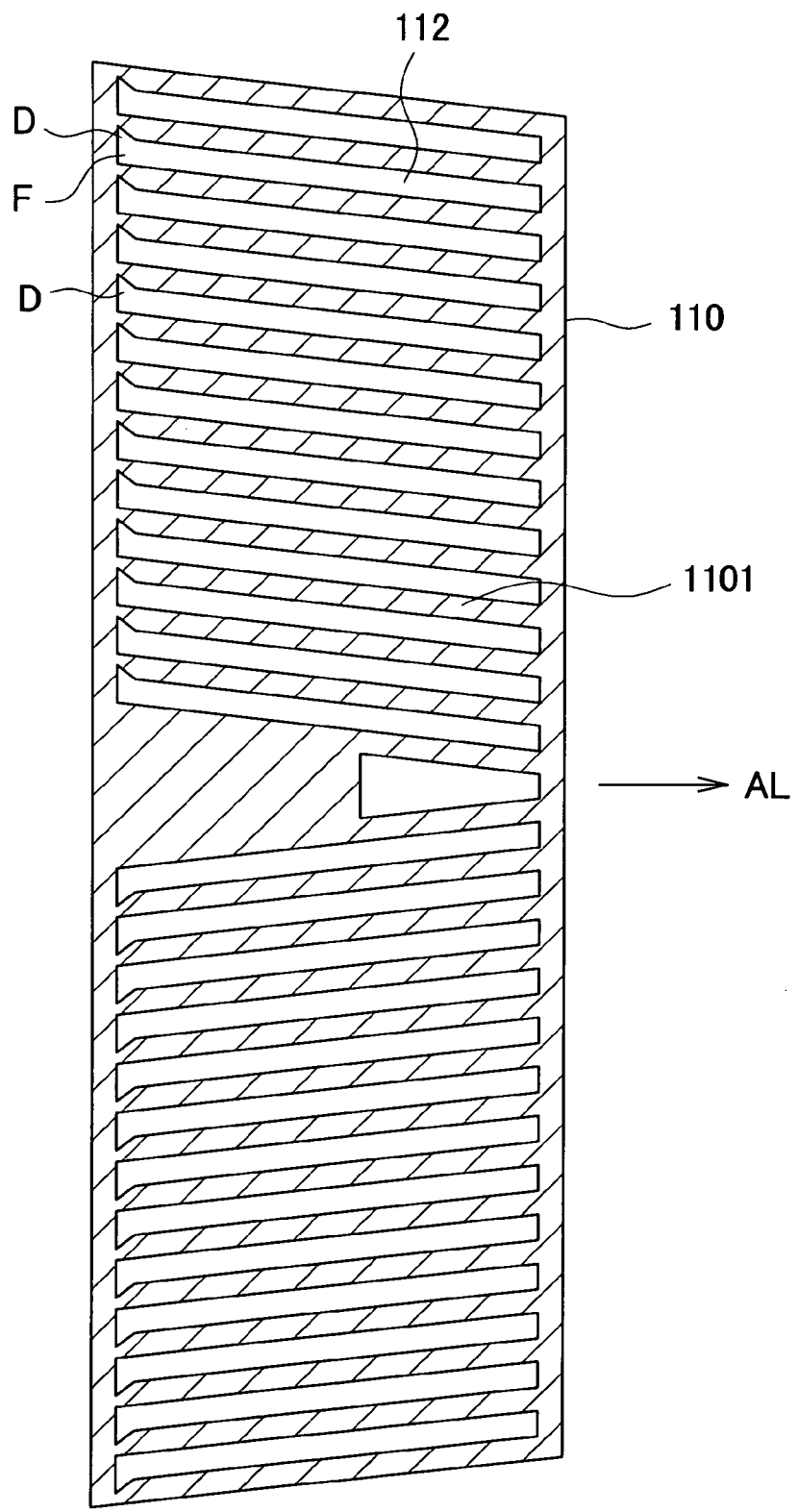
FIG. 15 is an enlarged view of the pixel electrodes according to still another modification of the embodiment 2.

In the above-mentioned embodiment, the cut-off portion D is formed in both ends of the comb-teeth-shaped electrode 1101. When the cut-off portion D is formed in both ends of the comb-teeth-shaped electrode 1101, a possibility of occurrence of the disconnection in the comb-teeth-shaped electrode 1101 is increased. To further reduce the possibility of occurrence of the disconnection, as shown in FIG. 14, the cut-off portion D may not be formed in one side of the comb-teeth-shaped electrode 1101 and the cut-off portion D may be formed only in another side of the comb-teeth-shaped electrode 1101. Due to such constitution, a transmissivity enhancing effect is halved compared to the case shown in FIG. 13. However, the possibility of occurrence of the disconnection of the comb-teeth-shaped electrode 1101 is largely decreased. That is, although the possibility of the disconnection of the comb-teeth-shaped electrode 1101 exists on both sides of the comb-teeth-shaped electrode 1101 in the pixel constitution shown in FIG. 13, the possibility of the disconnection on side of the comb-teeth-shaped electrode 1101 is extremely small in the pixel constitution shown in FIG. 14 and hence, the probability that the whole comb-teeth-shaped electrode 1101 suffers from the insufficient electrical conduction becomes extremely small. In the pixel electrode 110 shown in FIG. 15, non-cut-off portions are formed on a side of the comb-teeth-shaped electrode 1101 opposite to the side of the pixel electrode 110 shown in FIG. 14 on which the non-cut-off portions are formed. This pixel electrode 110 shown in FIG. 15 also can acquire the substantially same advantageous effect as the pixel electrode 110 shown in FIG. 14.

Embodiment 3

Figure 16:
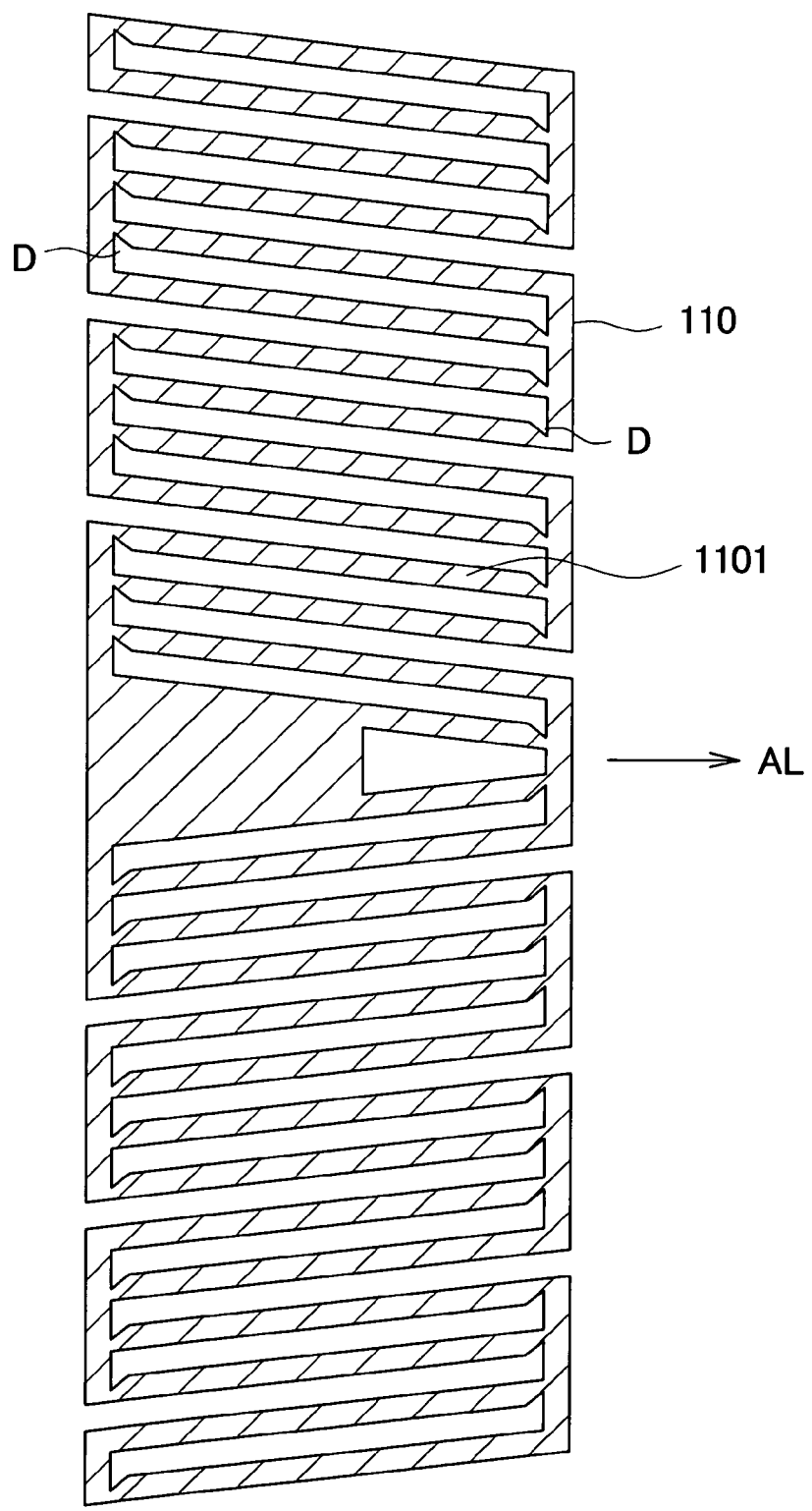
FIG. 16 is an enlarged view of a pixel electrode of an embodiment 3.
Figure 17:
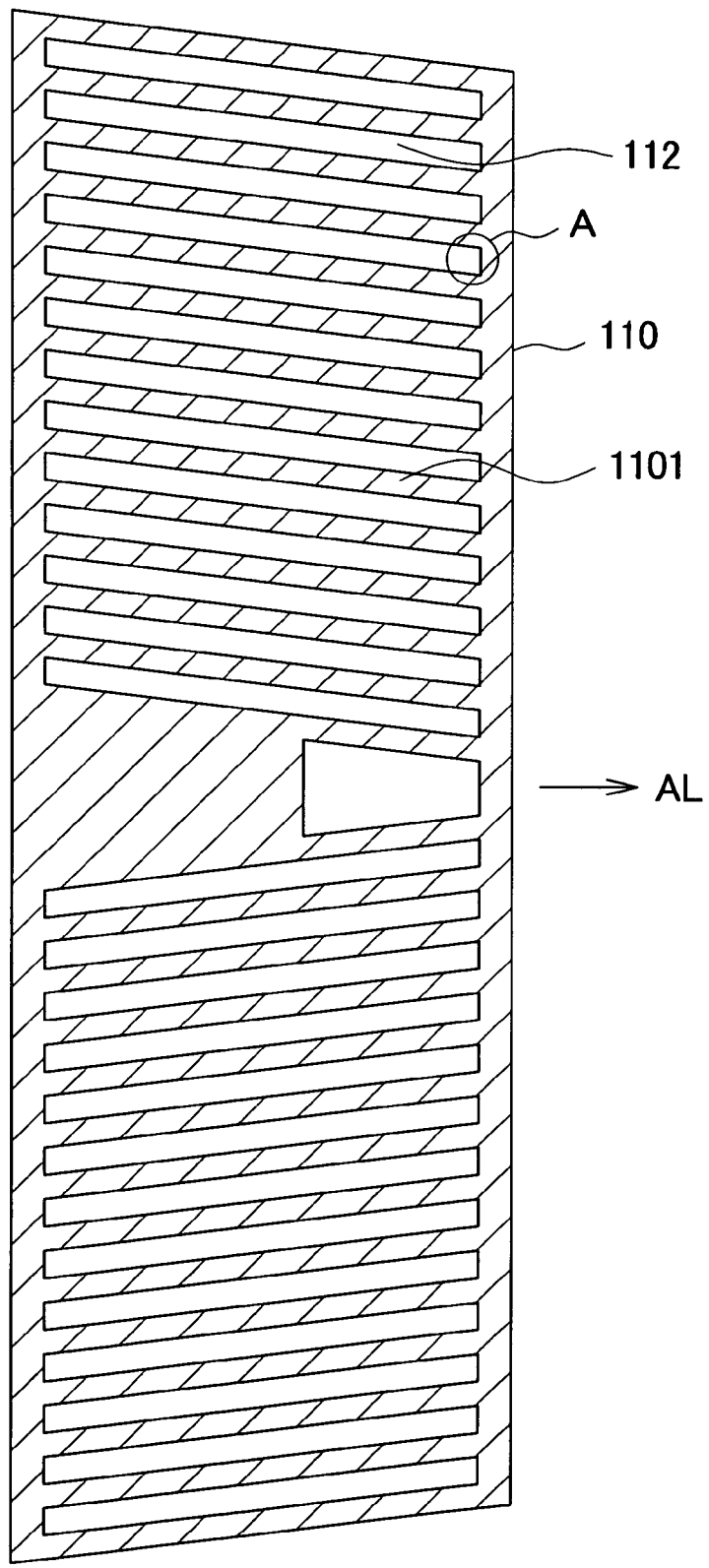
FIG. 17 is a view showing an example of a pixel electrode to which the present invention is not applied.

FIG. 16 is a plan view of the pixel electrode 110 showing a third embodiment of the present invention. The pixel electrode 110 shown in FIG. 16 has a laterally-extending trapezoidal shape, and a profile of the pixel electrode 110 is substantially equal to a profile of the corresponding pixel electrode 110 shown in FIG. 3. Further, the arrangement of the pixels is substantially equal to the corresponding arrangement of the pixels shown in FIG. 2 and hence, the arrangement of the pixels is omitted. That is, also in this embodiment, the pixels adopt the packed arrangement in the longitudinal direction as well as in the lateral direction. Although FIG. 16 shows only the pixel corresponding to the pixel of the first embodiment shown in FIG. 3, a pixel shape corresponding to the pixel shape shown in FIG. 6 appears in symmetry with the pixel shape shown in FIG. 16 and hence, the pixel shape corresponding to the pixel shape shown in FIG. 6 is omitted. The technical feature of the arrangement of the pixel electrodes 110 in this embodiment is exactly same as the technical feature of the arrangement of the pixel electrodes 110 explained in conjunction with the embodiment 1. Further, an alignment axis of liquid crystal on a TFT substrate 100 is a direction indicated by symbol AL in FIG. 16.

Also in the pixel electrode 110 shown in FIG. 16, in the same manner as the pixel electrode 110 shown in FIG. 3, the slits 112 of the pixel electrode 110 have end portions thereof opened for every one other slit (at a rate of one slit for every two slits). That is, the slit 112 having both ends thereof closed and the slit 112 having only one-side end portion thereof opened are alternately arranged next to each other in parallel. However, the opened end portions of the slits 112 are formed alternately on different sides of the trapezoidal pixel electrode 110. Accordingly, within one pixel electrode 110, all comb-teeth-shaped electrodes 1101 are made conductive with each other. In a portion where a distal end is opened, there is no possibility that an abnormal domain is formed. Accordingly, the transmissivity of the pixel can be enhanced correspondingly. That is, the pixel electrode 110 shown in FIG. 16 also acquires the advantageous effect of the pixel electrode 110 of the embodiment 1.

The constitution which makes the pixel electrode 110 shown in FIG. 16 different from the pixel electrode 110 shown in FIG. 3 lies in that cut-off portions D are formed in a closed distal end portion of the pixel electrode 110. Advantageous effects obtained by the cut-off portions D are exactly as same as the advantageous effects explained in conjunction with the embodiment 2. That is, this embodiment possesses both of the advantageous effects acquired by the embodiment 1 and the advantageous effects acquired by the embodiment 2. In this manner, this embodiment can further enhance the transmissivity of the liquid crystal display device than the embodiment 1 and the embodiment 2.

Although the pixel electrode 110 shown in FIG. 16 can enhance the transmissivity, the possibility of the disconnection of the comb-teeth-shaped electrode 1101 is larger than the possibility of the disconnection of the comb-teeth-shaped electrode 1101 in the embodiment 1. To cope with the disconnection of the comb-teeth-shaped electrode 1101 of the pixel electrode 110 shown in FIG. 16, in the same manner as the pixel electrode 110 shown in FIG. 14 or FIG. 15 explained in conjunction with the embodiment 2, the cut-off portion D may be formed in only one side of the comb-teeth-shaped electrode 1101.

Further, the pixel structure shown in FIG. 16 may be combined with the pixel structure explained in conjunction with FIG. 4 or FIG. 5.

In the above-mentioned embodiment, the explanation has been made by assuming that the pixel arrangement shown in FIG. 16 is equal to the pixel arrangement shown in FIG. 2. However, the pixel arrangement shown in FIG. 16 may be equal to the pixel arrangement shown in FIG. 9. Alternatively, a profile of the pixel may be a rectangular shape or the pixel arrangement shown in FIG. 10 may be adopted.

What is claimed is:

1. A liquid crystal display device comprising:
a TFT substrate;
a counter substrate; and
liquid crystal which is sandwiched between the TFT substrate and the counter substrate, wherein
the TFT substrate includes planar first electrodes, an insulation film which covers the first electrodes, and second electrodes which are formed on the insulation film in an overlapping manner with the first electrodes,
the second electrode includes slits and comb-teeth-shaped electrodes,
the liquid crystal is configured to be driven by an electric field generated due to potential difference between the first electrode and the second electrode, and
the slits are configured such that the slits having both ends thereof closed and the slits having only one-side end portion thereof opened are alternately arranged next to each other in parallel.

2. A liquid crystal display device according to claim 1, wherein within one pixel, the slits having only one-side end portions thereof opened are configured such that the slit opened on one end portion side and the slit opened on another end portion side are arranged alternately by way of the slit having both end portions thereof closed.

3. A liquid crystal display device according to claim 1, wherein within one pixel, the slits having said only one-side end portions thereof opened include the slits opened on one end portion side and the slits opened on another end portion side.

4. A liquid crystal display device according to claim 1, wherein within one pixel, the slits having said only one-side end portions thereof opened are opened only on the same one end portion side respectively.

5. A liquid crystal display device comprising:
a TFT substrate;
a counter substrate; and
liquid crystal which is sandwiched between the TFT substrate and the counter substrate, wherein
the TFT substrate includes planar first electrodes, an insulation film which covers the first electrodes, and second electrodes which are formed on the insulation film in an overlapping manner with the first electrodes,
the second electrode includes slits and comb-teeth-shaped electrodes,
the liquid crystal is configured to be driven by an electric field generated due to potential difference between the first electrode and the second electrode, and
the comb-teeth-shaped electrode is configured such that a cut-off portion which is integrally formed with the slit is formed in one end portion side of comb-teeth-shaped electrode, and said one end portion side of the comb-teeth-shaped electrode has a width smaller than a width of another end portion side of the comb-teeth-shaped electrode.

6. A liquid crystal display device according to claim 5, wherein the slits are configured such that the slits having both ends thereof closed and the slits having only one-side end portions thereof opened are alternately arranged next to each other in parallel.

7. A liquid crystal display device comprising:
a TFT substrate;
a counter substrate; and
liquid crystal which is sandwiched between the TFT substrate and the counter substrate, wherein
the TFT substrate includes planar first electrodes, an insulation film which covers the first electrodes, and second electrodes which are formed on the insulation film in an overlapping manner with the first electrode,
the second electrode includes slits and comb-teeth-shaped electrodes,
the liquid crystal is configured to be driven by an electric field generated due to potential difference between the first electrode and the second electrode, and
the comb-teeth-shaped electrode includes a first side and a second side which respectively extend in a longitudinal direction and face each other in an opposed manner with the slit sandwiched therebetween, a cut-off portion which is integrally formed with the slit is formed only in one side out of the first side and the second side on at least one end portion of the comb-teeth-shaped electrode, and another side out of the first side and the second side is formed in a straight line without being bent.

8. A liquid crystal display device according to claim 7, wherein the cut-off portion which is integrally formed with the slit only on one side is formed in both end portions of the comb-teeth-shaped electrode.

9. A liquid crystal display device according to claim 7, wherein the cut-off portion which is integrally formed with the slit only on one side is formed in only one end portion of the comb-teeth-shaped electrode.

* * * * *